United States Patent
Chen et al.

(10) Patent No.: US 12,542,918 B2
(45) Date of Patent: Feb. 3, 2026

(54) TWO-LAYERED IMAGE COMPRESSION FOR TEXT CONTENT

(71) Applicant: GOOGLE LLC, Mountain View, CA (US)

(72) Inventors: Di Chen, Sunnyvale, CA (US); Balineedu Adsumilli, Sunnyvale, CA (US); Debargha Mukherjee, Cupertino, CA (US); Yao-Chung Lin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 69 days.

(21) Appl. No.: 18/522,830

(22) Filed: Nov. 29, 2023

(65) Prior Publication Data

US 2025/0175628 A1    May 29, 2025

(51) Int. Cl.
| | |
|---|---|
| *H04N 19/30* | (2014.01) |
| *G06V 20/62* | (2022.01) |
| *G06V 30/14* | (2022.01) |
| *G06V 30/18* | (2022.01) |
| *G06V 30/19* | (2022.01) |
| *H04N 19/119* | (2014.01) |
| *H04N 19/176* | (2014.01) |
| *H04N 19/186* | (2014.01) |
| *H04N 19/46* | (2014.01) |
| *H04N 19/85* | (2014.01) |

(52) U.S. Cl.
CPC ........... *H04N 19/30* (2014.11); *G06V 20/635* (2022.01); *G06V 30/1444* (2022.01); *G06V 30/18076* (2022.01); *G06V 30/19173* (2022.01); *H04N 19/119* (2014.11); *H04N 19/176* (2014.11); *H04N 19/186* (2014.11); *H04N 19/46* (2014.11); *H04N 19/85* (2014.11)

(58) Field of Classification Search
CPC .... H04N 19/30; H04N 19/119; H04N 19/176; H04N 19/186; H04N 19/46; H04N 19/85; G06V 30/1444; G06V 20/635; G06V 30/18076; G06V 30/19173
See application file for complete search history.

(56) References Cited

U.S. PATENT DOCUMENTS

| | | | | |
|---|---|---|---|---|
| 9,027,099 | B1* | 5/2015 | Saylor | G06F 16/5854 713/168 |
| 2007/0012862 | A1* | 1/2007 | Kanatsu | H04N 1/642 250/208.1 |
| 2009/0323089 | A1* | 12/2009 | Hayasaki | H04N 1/642 358/1.9 |
| 2015/0254401 | A1* | 9/2015 | Sankhe | G16H 30/40 382/132 |

* cited by examiner

*Primary Examiner* — Jae N Noh

(74) *Attorney, Agent, or Firm* — Young Basile Hanlon & MacFarlane, P.C.

(57) ABSTRACT

Coding an image that includes text content and a background is disclosed. Text portions are identified in the image. The text portions are extracted from the image to obtain a background image, where the background image includes holes corresponding to respective areas of the text portions within the image. A filled-in background image is obtained based on the background image. The filled-in background image is encoded into a compressed bitstream using a block-based encoder. The text portions is also encoded into the compressed bitstream. Encoding the text portions includes encoding respective high quality text binarization upscaled binary maps.

20 Claims, 17 Drawing Sheets

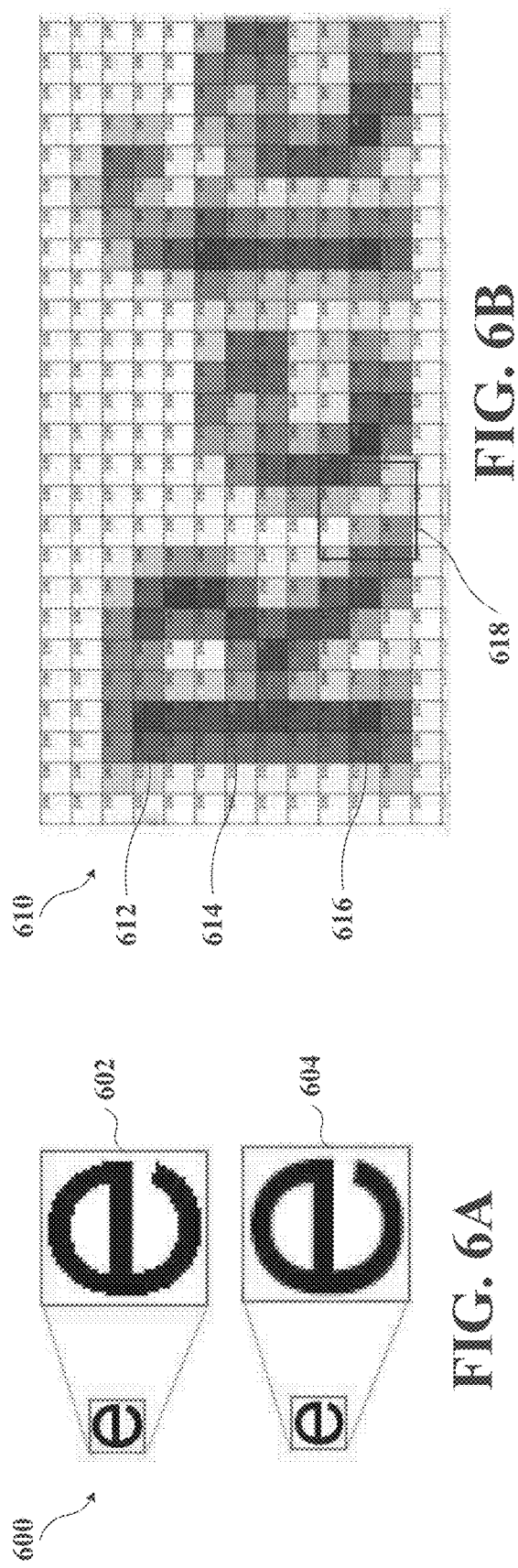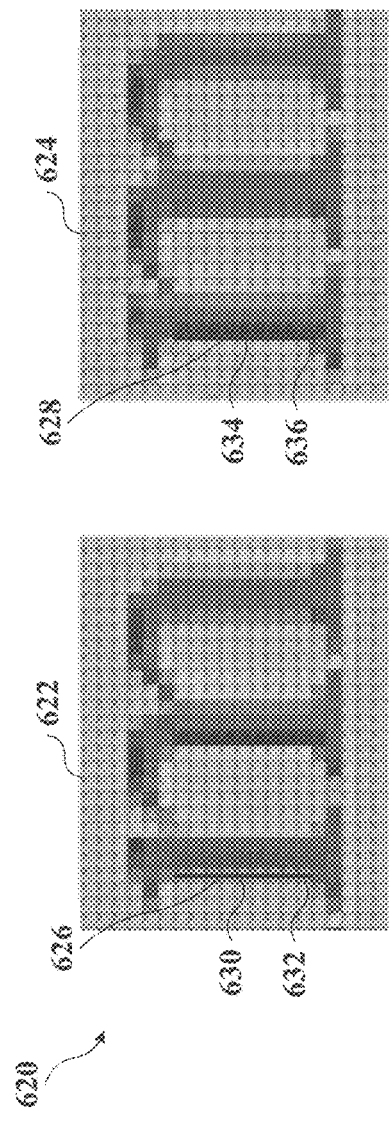
FIG. 6A
FIG. 6B
FIG. 6C

TWO-LAYERED IMAGE COMPRESSION FOR TEXT CONTENT

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A first aspect is a method for coding an image that includes text content and a background. The method includes identifying text portions in the image; extracting the text portions from the image to obtain a background image, where the background image includes holes corresponding to respective areas of the text portions within the image; obtaining a filled-in background image based on the background image; encoding, into a compressed bitstream, the filled-in background image using a block-based encoder; and encoding, into the compressed bitstream, the text portions.

A second aspect is a device for coding an image that includes text content and a background. The device includes a processor that is configured to identify text portions in the image; extract the text portions from the image to obtain a background image, where the background image includes holes corresponding to respective areas of the text portions within the image; obtain a filled-in background image based on the background image; encode, into a compressed bitstream, the filled-in background image using a block-based encoder; and encode, into the compressed bitstream, the text portions.

A third aspect is a method for decoding an image. The method includes decoding, from a compressed bitstream, a background image of the image using a block-based decoder; decoding, from the compressed bitstream, respective locations of text symbols; and overlaying, based on the respective locations, the text symbols on the background image to obtain the image.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 6A illustrates an example of the effects of aliasing and anti-aliasing; and FIG. 6B illustrates an example of influence on a symbol from adjacent symbols.

FIG. 10 illustrates an example of a text binarization output.

DETAILED DESCRIPTION

In a block-based coding scheme, primarily designed for compressing image data through the exploitation of spatial redundancy and motion estimation (e.g., temporal redundancy), the typical approach involves dividing an image, such as a video frame, into multiple discrete blocks. Images, including video frames, often contain textual content, which has conventionally been overlooked and treated without any specialized consideration during the encoding or decoding processes. To illustrate this issue further, conventional encoding methods may divide textual content, even a single letter, into multiple blocks, effectively stripping it of its inherent textual properties, and coding it as any other generic image content.

Encoding textual content in images presents many issues, some of which are further described herein. These problems are related to aliasing and anti-aliasing, high residual values, grid alignment, and influence from adjacent characters or the background. Residuals associated with text symbols tend to be very large, therewith increasing the size of compressed bitstreams (e.g., the compressed bitstream 420 of FIG. 4), due to high frequency content around the edges of the text symbols.

Implementations of this disclosure address problems associated with coding of text content in images using a two-layered coding. Textual content in a video frame are separated from other content of the video frame therewith resulting in a text layer and a background layer. The background image can thus include holes. The holes are filled to generate a filled background image, which is then encoded (and later decoded) using conventional encoding (and decoding) techniques. The text layer can then be encoded (and decoded) using techniques, described herein, that are optimized for textual content. Distinct symbols are identified and stored, at the encoder side, in a dictionary. Techniques (e.g., upscaling and smooth edge identification) are described herein to obtain high visual quality reconstructed text and to minimize the number of distinct symbols added to the dictionary.

Figure 1:
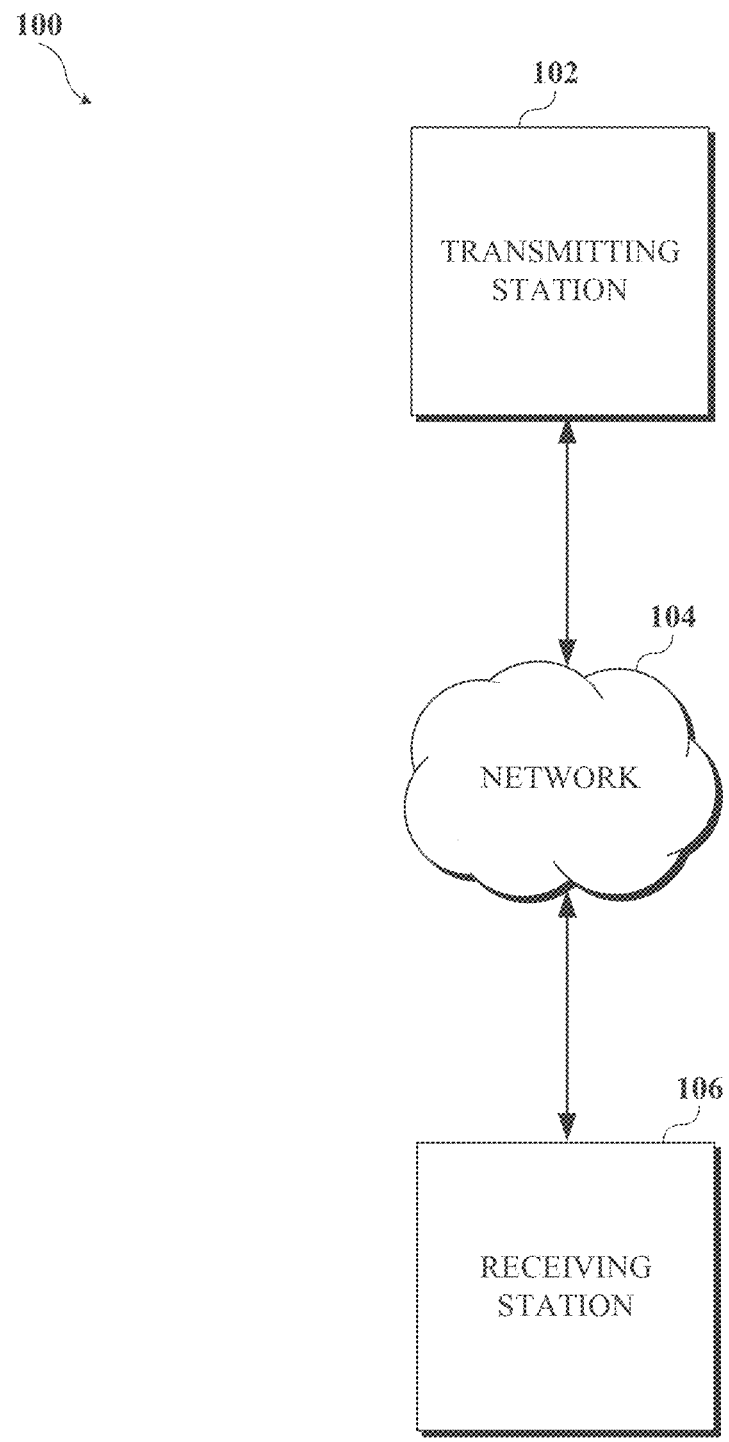
FIG. 1 is a schematic of a video encoding and decoding system.

Further details of techniques for two-layered compression for text content are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
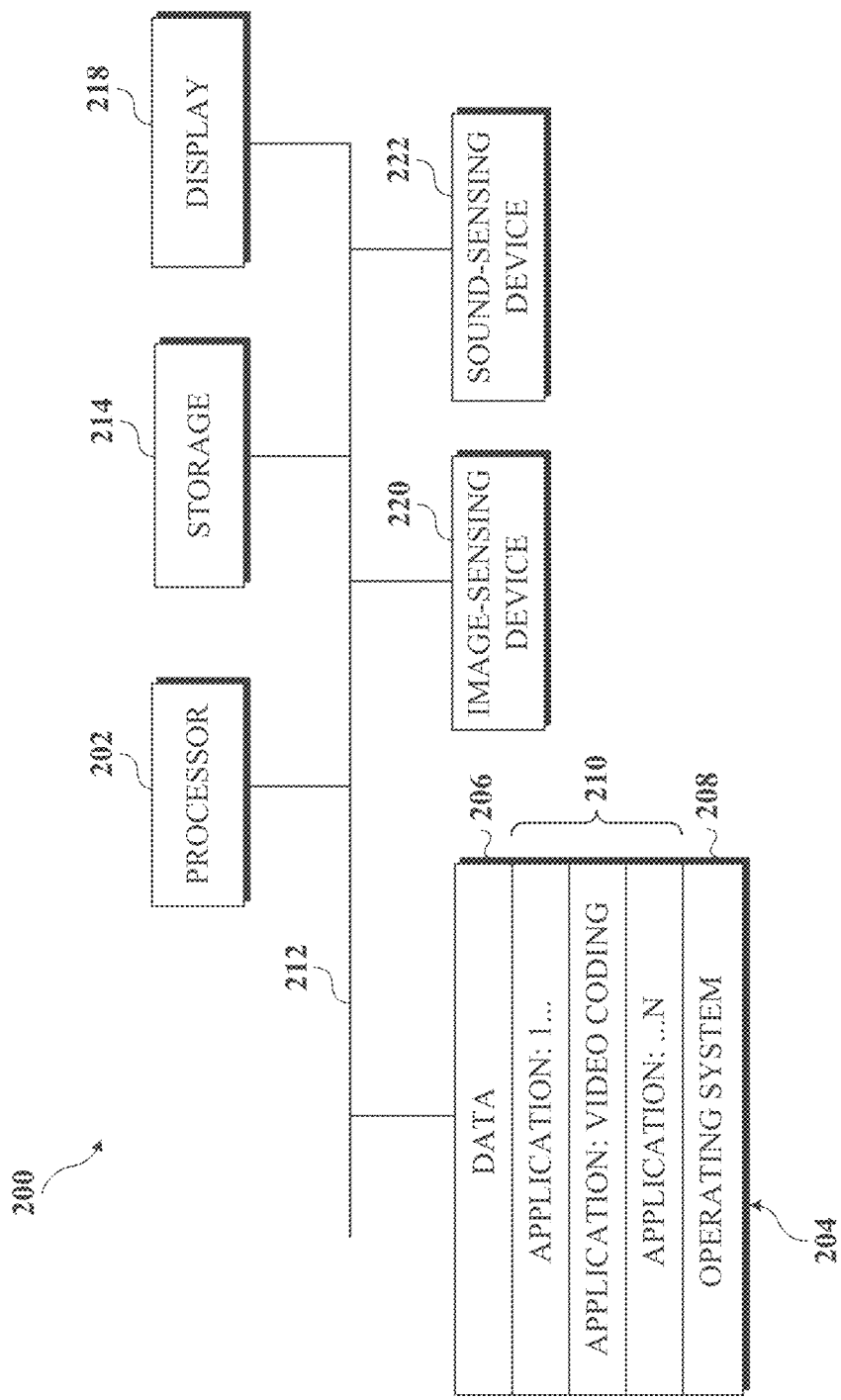
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
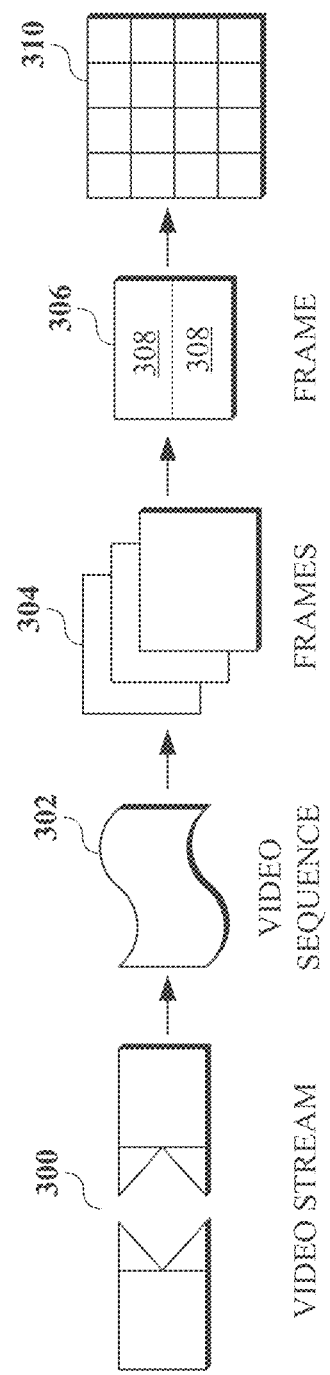
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
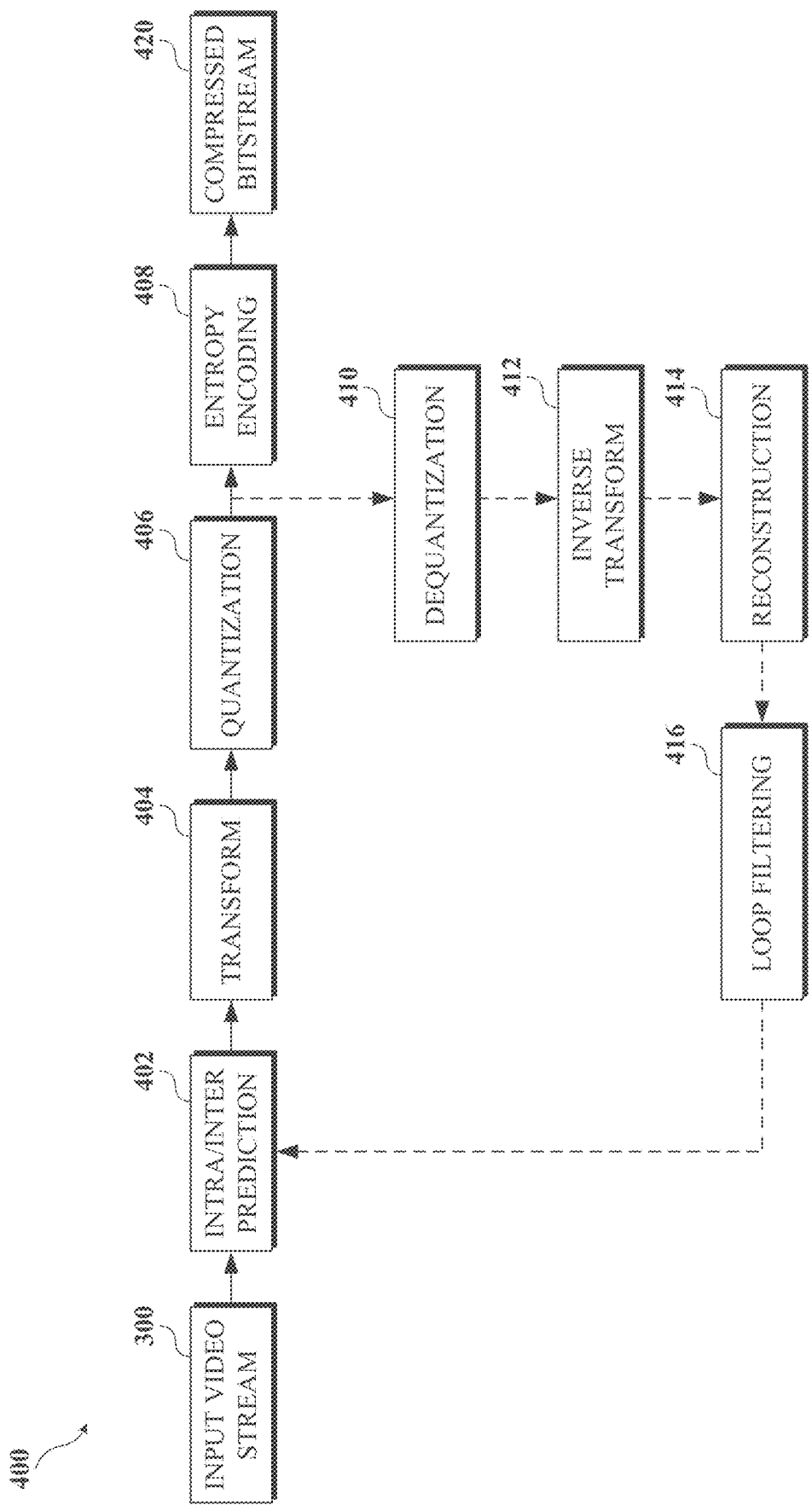
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
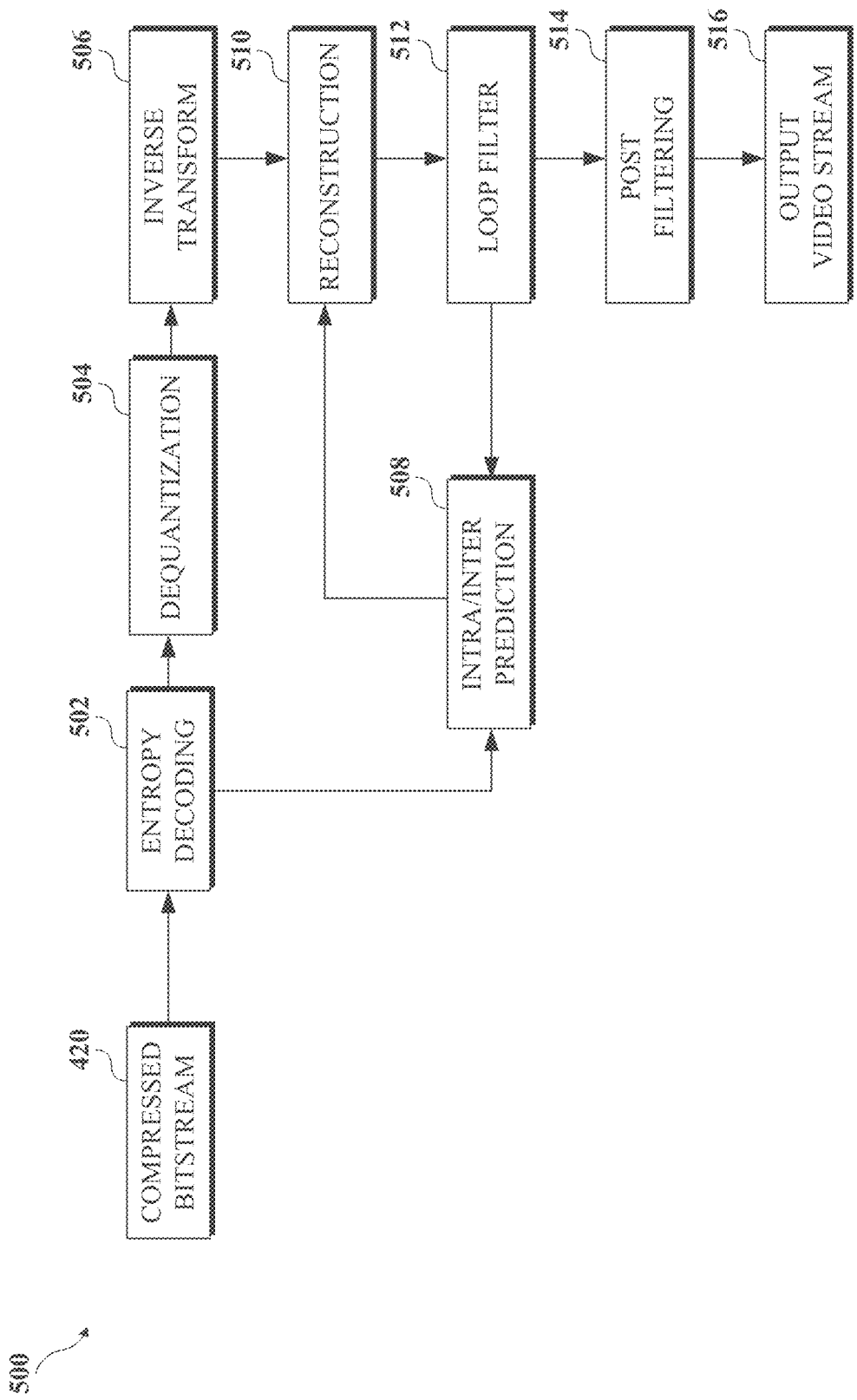
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the post filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the post filtering stage 514.

FIGS. 6A-6C illustrate examples of issues relating to textual content in images.

FIG. 6A illustrates an example 600 of the effects of aliasing and anti-aliasing. Aliasing degrades the quality of textual content in images. Aliasing occurs when high-frequency details, such as fine text characters in video frames, are inadequately sampled during the encoding process, resulting in a loss of information. If aliasing is not addressed, it can lead to distorted and jagged text representations in the encoded video frames, significantly impairing the legibility and overall quality of textual content in the final output. A symbol 602 illustrates the jagged edges of a text symbol (e.g., the letter "e") resulting from aliasing.

To counter aliasing, anti-aliasing techniques are typically employed, which involve smoothing the jagged edges and artifacts caused by inadequate sampling of fine details. Anti-aliasing achieves this by introducing a controlled blurring effect, which can, in turn, degrade the sharpness and overall image quality. Values of pixels on edges (e.g., edges of text symbols) may be smoothed by setting them to weighted sums of several respective surrounding (e.g., adjacent) pixels. A symbol 604 illustrates the smoothed, blurred edges of the text symbol after anti-aliasing.

FIG. 6B illustrates an example 610 of influence on a symbol from adjacent symbols. Videos that are user-generated content (UGC) may be uploaded to, for example, a video sharing platform. A video may be compressed during the upload process. The decompression process results in further degradation of the text quality in the video frames, such as due to smoothing that may be applied. For example, one or more stages (e.g., the loop filtering stage 416) of a conventional encoder (e.g., the encoder 400 of FIG. 4) may perform such smoothing. As such, values of pixels on edges (e.g., edges of text symbols) may be set to weighted sums of several respective surrounding (e.g., adjacent) pixels. This presents the problem that since text edges are now weighted sums, these edges may include many colors (e.g., edge pixels of a same symbol having different pixel values). To illustrate, pixels 612, 614, and 616, which are pixels on an edge of a text symbol (e.g., the letter "R"), have the luminance values 164, 126, and 101, respectively. Thus, the blurring of edges makes it impossible to obtain clean (e.g., crisp, sharp, straight, etc.) edges.

The example 610 also illustrates an example of the influence from adjacent symbols. An area 618 illustrates that the letters "R" and "e" are no longer distinctly separated making it difficult to identify where the edges of the "R" stop and the edges of the "e" start, and vice versa. This in turn also makes it difficult to obtain an accurate text binarization (further described herein).

FIG. 6C illustrates an example 620 of issues associated with grid alignment. When text (e.g., a text symbol) is placed on an image, the text may not be placed at an integer pixel location. The text symbol may be placed at a ¼ or ½ pixel location. As such, if two instances of the same symbol (such as two occurrences of the letter "m") share the same color, font, and size but are located at different grid positions, they will exhibit distinct edge characteristics. In the example 620, the same letter "m" is placed at two different locations within the same frame: at a location 622, and at a location 624. At the location 622, the letter "m" is placed at a ½ pixel location, as illustrated by an edge line 626; and at the location 624, the letter "m" is placed at an integer pixel location, as illustrated by an edge line 628. As can be seen in the example 620, the pixel values on the video frames are different at the edges. For example, pixels 630, 632 at the location 622 have pixel values 110, 96, respectively; on the other hand, corresponding pixels 634, 636 at the location 624 have pixels values 52, 52, respectively.

Figure 7:
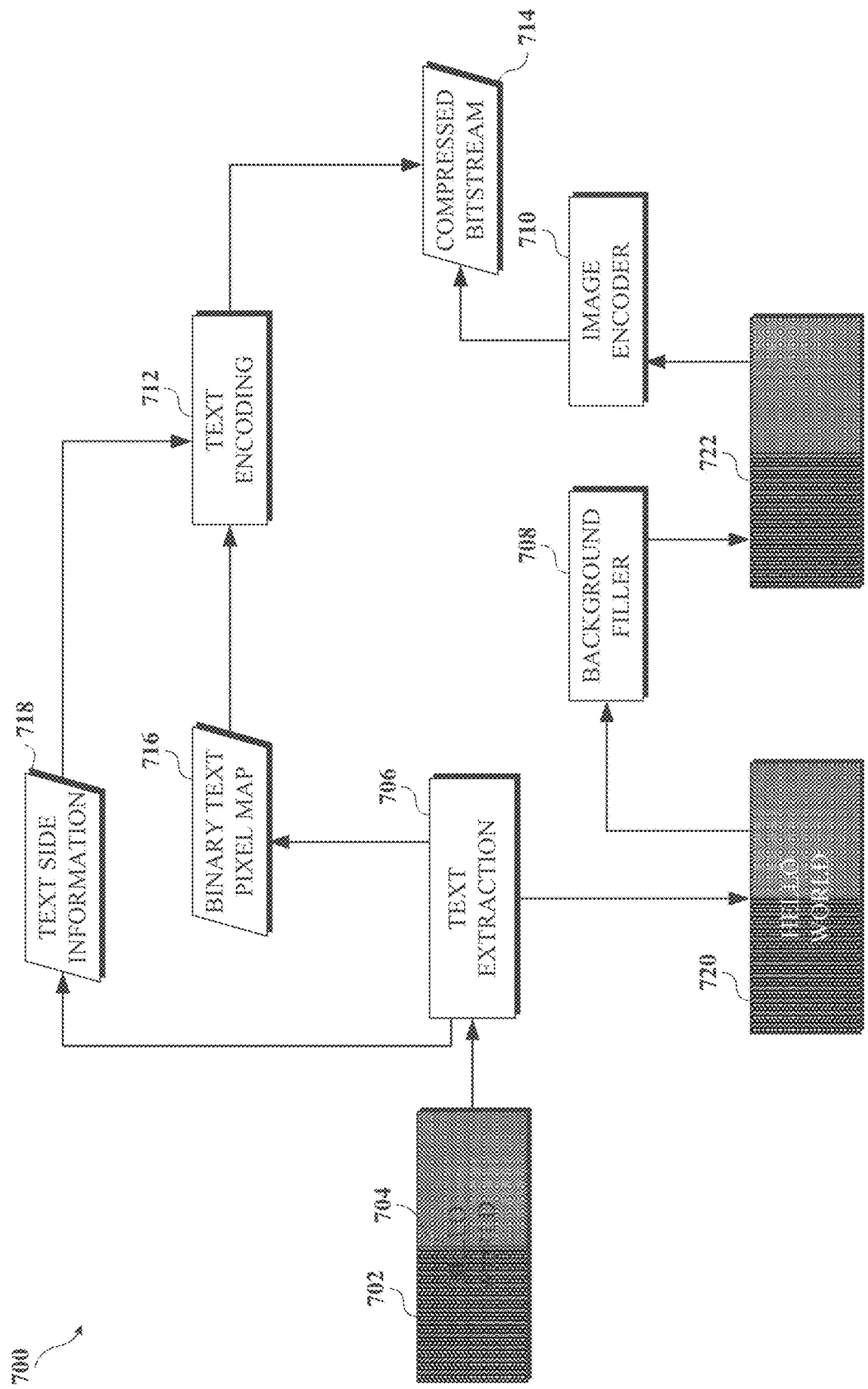
FIG. 7 is an example of an encoder for encoding an image of a video stream that includes textual content.

FIG. 7 is an example of an encoder 700 for encoding an image 702 of a video stream that includes textual content 704. The encoder 700 can be implemented in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 7. The encoder 700 can also be implemented as specialized hardware included in, for example, the transmitting station 102. In one particularly desirable implementation, the encoder 700 is a hardware encoder.

As depicted in FIG. 7, the textual content 704 is represented as the string "HELLO WORLD." It is important to note that this textual content can be spread over the entirety of the image 702, and various characters within it may exhibit distinct font sizes and font colors. Furthermore, the textual content may encompass symbols from diverse languages. Additionally, while, for simplicity of illustration, the image 702 is shown as including the textual content 704 overlayed over two patterned boxes, the non textual content of the image 702 can be any content and is not in any way limited by the illustrative image of FIG. 7 (i.e., by the image 702).

The encoder 700 includes the following stages to produce an encoded or compressed bitstream 714 using the video stream as input: a text extraction stage 706, a background filler stage 708, an image encoder stage 710, and a text encoding stage 712. From an input video (which includes the image 702), the encoder 700 produces a compressed bitstream 714.

The text extraction stage 706 obtains the binary text pixel map 716 in such a way as to overcome the above described problems. The text extraction stage 706 receives the image 702 and separates the image into the background image 720 with pixels of text symbols removed and a binary text pixel map 716 with text side information 718, as further described herein.

The text extraction stage 706 identifies text portions in the image 702. The text extraction stage 706 determines which portions of the image 702 are considered to be or include text pixels and which are to be considered background pixels. For those portions of the image 702 determined to be or include text, the text extraction stage 706 generates and further operates on reversed anti-aliased versions therefor, as described herein. The concept of reverse anti-aliasing is illustrated with respect to FIG. 8.

Figure 8:
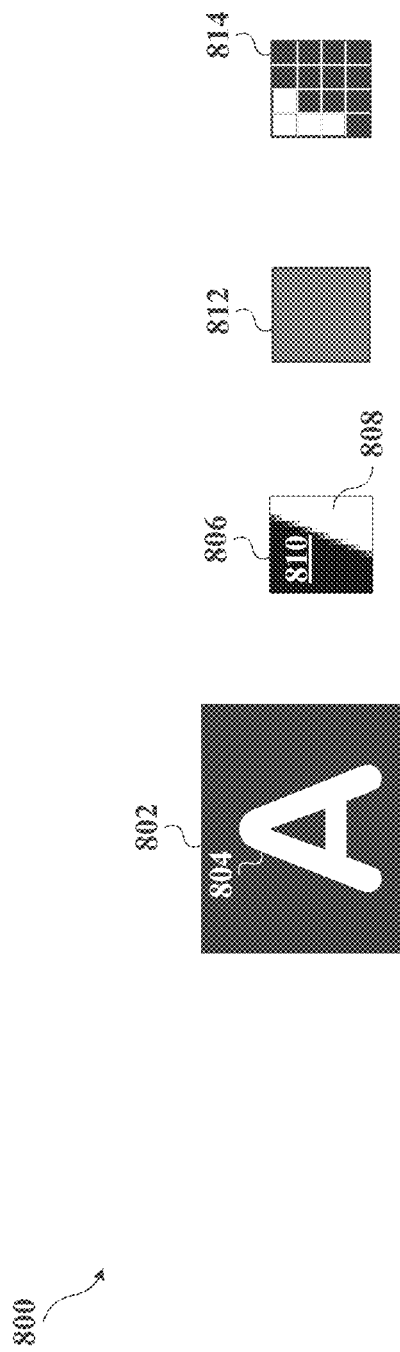
FIG. 8 is an illustration for describing the concept of reverse anti-aliasing used in two-layer compression for text content.

FIG. 8 is an illustration 800 for describing the concept of reverse anti-aliasing used in two-layer compression for text content. Assume that an analog letter "A" is placed on an image grid 802. An edge of the analog letter "A" includes a pixel 804, which is shown in an expanded view for clarity as a pixel 806. A portion 808 of the pixel 806 belongs to the letter "A" and may have a pixel value of $P_t$; and a portion 810 of the pixel 806 belongs to the background of the image grid 802 and may have a pixel value of $P_b$. If $w_t$ percent of the pixel 806 is occupied by a portion of the letter "A" and $w_b$ percent of the pixel 806 is occupied by the background, then a hypothetical anti-aliasing process may assign a value=$w_t P_t + w_b P_b$ to that pixel to obtain a pixel 812.

The reverse anti-aliasing technique is based on upscaling each pixel in the text content according to an N×N scaling factor. In the illustration 800, N=4; however, other values of N are possible. As such, each pixel (e.g., the pixel 806) is upscaled to an upscaled pixel 814. A portion $w_t$ of the sub-pixels of the upscaled pixel 814 are assigned the pixel value $P_t$; and a portion $w_b$ of the sub-pixels of the upscaled pixel 814 as assigned the pixel value $P_b$. The illustration 800 shows that 12 out of the 12/16 sub-pixels are assigned one color value and 4/16 sub-pixels are assigned another color value.

The reverse anti-aliasing technique further described herein identifies values for the weights $w_t$ and $w_b$ by identifying, in an upscaled pixel, the number of sub-cells that are assigned the value 1 (indicating text sub-cells) and the number of sub-cells that are assigned the value 0 (indicating background sub-cells) and also identifying which of the sub-cells are to be assigned the value 1 and which are to be assigned the value 0.

Figure 9:
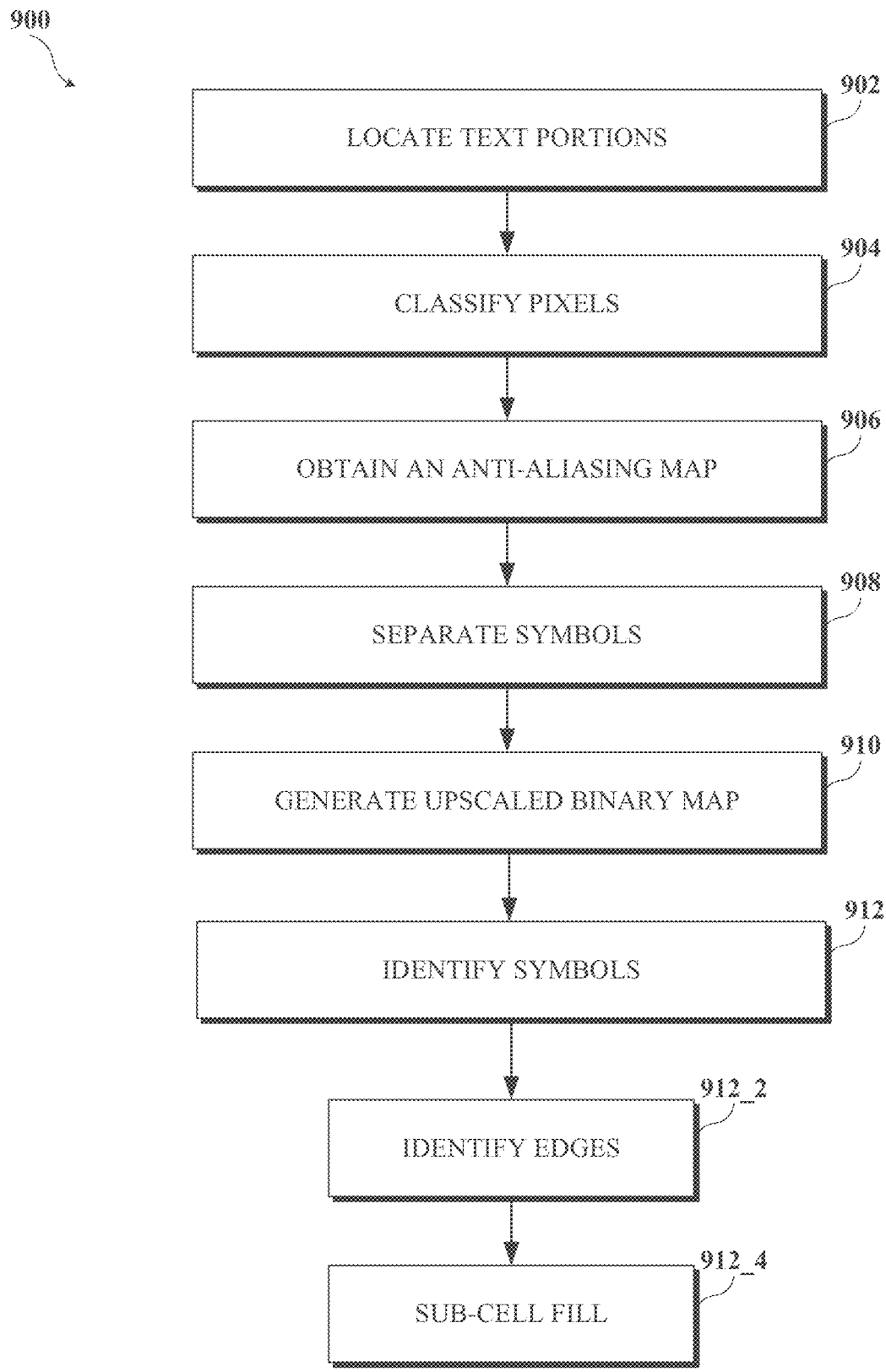
FIG. 9 is a flowchart of a technique for encoding text in an image.

FIG. 9 is a flowchart of a technique 900 for encoding text in an image. The technique 900 can be performed by the text extraction stage 706 of the encoder 700 of FIG. 7. The technique 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 900. The technique 900 can be implemented using specialized hardware or firmware. Multiple processors, memories, or both, may be used.

At 902, text portions are located. A text portion is a portion of an image, such as the image 702 of FIG. 7. In an example, the text extraction stage 706 may use optical character recognition (OCR) techniques to identify the textual content 704 in the image 702. In an example, the text extraction stage 706 may use or include an OCR tool that can identify the textual content 704 in the image 702.

Conventional OCR techniques are typically used to convert printed or handwritten text within an image or document into machine-readable text. Conventional OCR techniques are aimed at text recognition accuracy and are not concerned with text reconstruction, as illustrated with respect to FIG. 10. That is, for example, conventional OCR techniques are not optimized for improved image quality.

FIG. 10 illustrates an example of a text binarization output. An image portion 1002 may be an original image portion and an image portion 1004 may be a text binarization obtained there from using an OCR technique. As can be seen, the text of the image portion 1004 shows jagged edges, missing pixels, and noise (e.g., extraneous black pixels), and other topological structures. As such, conventional OCR techniques are not optimized to generate a text binarization result that has a satisfactory visual quality. A "binarization result" refers to the process of converting a grayscale or color image containing text into a binary image. In the binary image, each pixel is either black (usually representing the foreground or text) or white (representing the background). The purpose of binarization is to separate the text from the background. To be clear, in this context, background pixels refers to pixels within bounding boxes (further described herein) as opposed to pixels of the background image 720.

As such, and as further described herein, the text extraction stage 706 uses the identified text locations and regions obtained via OCR as a starting point and binarizes the identified text portions as further described herein.

In the text locating step, portions within the image that contain text are identified. A set of bounding boxes are outlined to isolate the text from the background. In the binarization step, the binary text pixel map 716 is extracted from the localized text regions. The binary text pixel map 716 represents the text as black characters on a white background, simplifying the character recognition process. Generation of the binary text pixel map 716 is further described herein.

Figure 11:
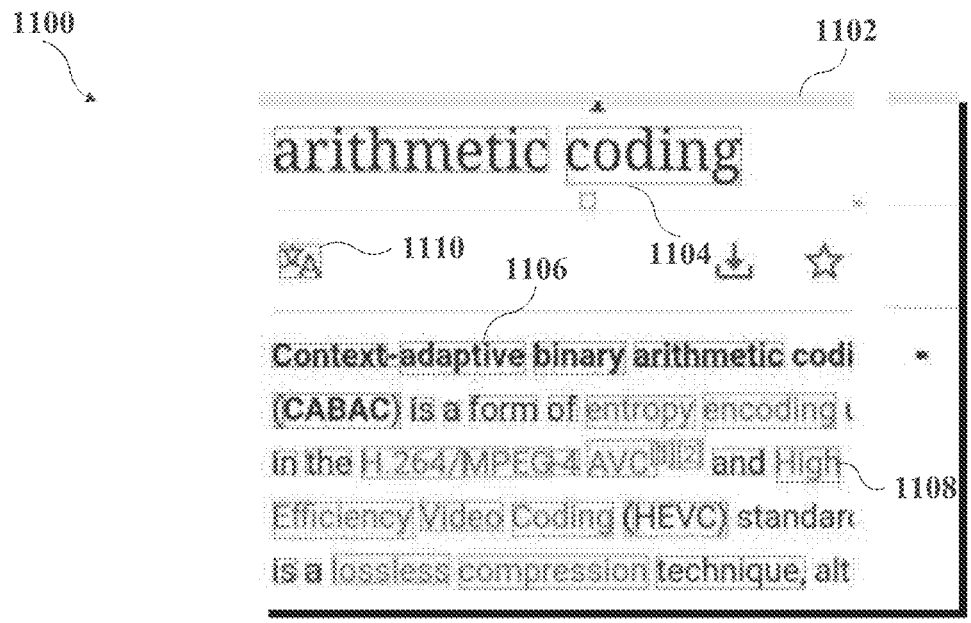
FIG. 11 illustrates an example of an output of a test locating step of the technique of FIG. 9.

FIG. 11 illustrates an example 1100 of an output of the test locating step 902 of the technique 900 of FIG. 9. The example 1100 includes a portion 1102 of an image, which may be the image 702 of FIG. 7. Portions that include text are identified. Each of the portions can be identified (e.g., described or characterized) by a bounding box, such as bounding boxes 1104-1110. Each of the image portions may have been associated therewith an extent (e.g., a width and a height) and a location (e.g., a location of the top-left corner of the bounding box).

If text in an image region includes text with different colors, then the image region can be divided into several bounding boxes, each including the same color text. The text locating step is performed after the bounding box is cut. The process proceeds by selecting a pixel having an identified text color and expansion outward, in all directions, from that pixel.

Referring again to FIG. 9, at 904, pixels in each of the image regions are classified into text pixels, edge pixels, and background pixels. The pixels in each image region are classified separately.

Given an image portion (i.e., bounding box), the technique 900 obtains an average background pixel value ($BG_{avg}$) from pixels on the circumference of the bounding box. In an example, the pixels in the original image that are outside of and surrounding the bounding box are used to obtain $BG_{avg}$. In another example, the pixels that are on the circumference and inside of the bounding box are used to obtain $BG_{avg}$. A maximum pixel value (MAX) within the bounding box is also obtained. The maximum pixel value (MAX) is the pixel value within the bounding box that is the furthest in magnitude from the average background pixel value $BG_{avg}$ amongst the pixels of the image region. The pixel values $BG_{avg}$ and MAX are for temporary use. They are used to separate the quantitative peak values: one (i.e., $BG_{avg}$) for the background pixels and the other (i.e., MAX) for the text. The actual background color and the text color may not in fact be these pixel values. That is, $BG_{avg}$ and MAX are only used for categorizing (e.g., classifying) pixels as text, background and edge.

The average background pixel value ($BG_{avg}$) and the maximum pixel value (MAX) are used to classify the pixels of the bounding box. Any number of techniques can be used to classify the pixels of the bounding box based on $BG_{avg}$ and MAX. In an example, range-based classification can be used. Assuming that $BG_{avg}$ is less (greater) than MAX, then the values $BG_{avg}$ and MAX can be used to define a range for pixel classification. A threshold T can be the midpoint between $BG_{avg}$ and MAX representing the boundary between background and text; pixels with values below (above) $BG_{avg}$ can be classified as background pixels, as they are closer to the average background value. Pixels with values above (below) MAX can be classified as text pixels, as they are the furthest from the background; and pixels with values between $BG_{avg}$ and MAX can be considered text edge pixels, as they are in the transition zone.

At 906, an anti-aliasing map is obtained (e.g., calculated, generated). An anti-aliasing map is obtained for each text region (i.e., for each bounding box). An anti-aliasing map can be a two dimensional array that includes, for each pixel of the bounding box, a corresponding value indicative of the amount of anti-aliasing that that pixel may have been subjected to. Each pixel value of a pixel of the bounding box is essentially converted into a percent value indicative of the amount of anti-aliasing that that pixel may have been subjected to. To facilitate, and simplify arithmetic operations, the percentage values can be normalized based on the upscaling factor N (e.g., N=4) described above.

Table I illustrates a pseudocode for obtaining the anti-aliasing map.

TABLE I

```
1  if pixel at bounding_box[i][j] is classified as BACKGROUND
2     set map[i][j] = 0
3  Else if pixel at bounding_box[i][j] is classified as TEXT
4     set map[i][j] = N²
5  Else //the pixel is an edge pixel
6     map[i][j] = (int)((back_y[i][j]-ry[i][j])/
       (back_y[i][j]-y_char)*N²+0.5)
```

In Table I, the indexes i and j are used to iterate over all pixels of the bounding box. That is, the steps of Table I are performed for each pixel in the bounding box. In Table I, back_y[i][j] is the average of the 6 background pixels surrounding the pixel at [i][j], y_char is the text pixel value, and ry[i][j] is the edge pixel value. In line 6 of Table I, an edge pixel is assigned a value in the anti-aliasing map based on a linear mapping. While text pixels of a symbol may have a fixed color, background pixels may include multiple colors. As such, y_char (the color associated with the text symbol) need not be indexed (e.g., y_char does not have [i][j]). y_char maps to 16; back_y[i][j] maps to 0. As such, ry[i][j] will map to (back_y[i][j]−ry[i][j])/(back_y[i][j]-y_char)*$N^2$ rounded to an integer. As mentioned above, if a pixel is upscaled to an 4×4 pixel, then N would be 4 and $N^2$ would be 16. Again, other upscaling values are possible, such as 3×3, 2×2, and so on.

Figure 12:
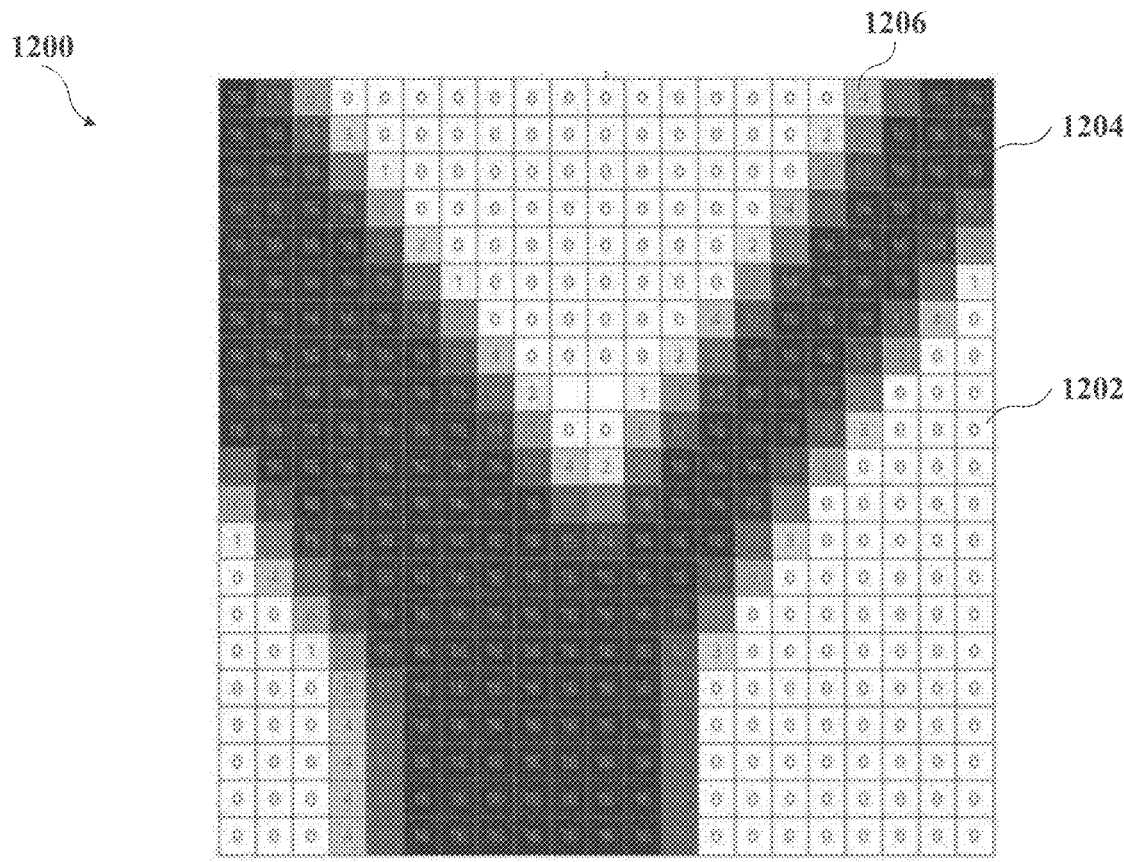
FIG. 12 illustrates a portion of an anti-aliasing map.

FIG. 12 illustrates a portion 1200 of an anti-aliasing map. A map location 1202 corresponds to a pixel that is classified as a background pixel and is thus assigned a value of 0; a map location 1204 corresponds to a pixel that is classified as a text pixel and is thus assigned a value of 16; and a map location 1206 corresponds to a pixel that is classified as an edge pixel and is thus assigned a value (e.g., 4) based on the linear mapping described above.

At 908 of FIG. 9, symbols are separated. As described with respect to FIG. 6B, text symbols may not be clearly delineated in the image (e.g., in a text region). Text symbols (e.g., characters) may be connected to each other, especially when they are very small and the edges are blurred. As further described herein, the text symbols are compressed, in a later, using a dictionary of unique symbols. The symbol separation step serves to minimize the number of unique symbols identified in the text of the image, which in turn contributes to minimizing the size of the dictionary.

Figure 13:
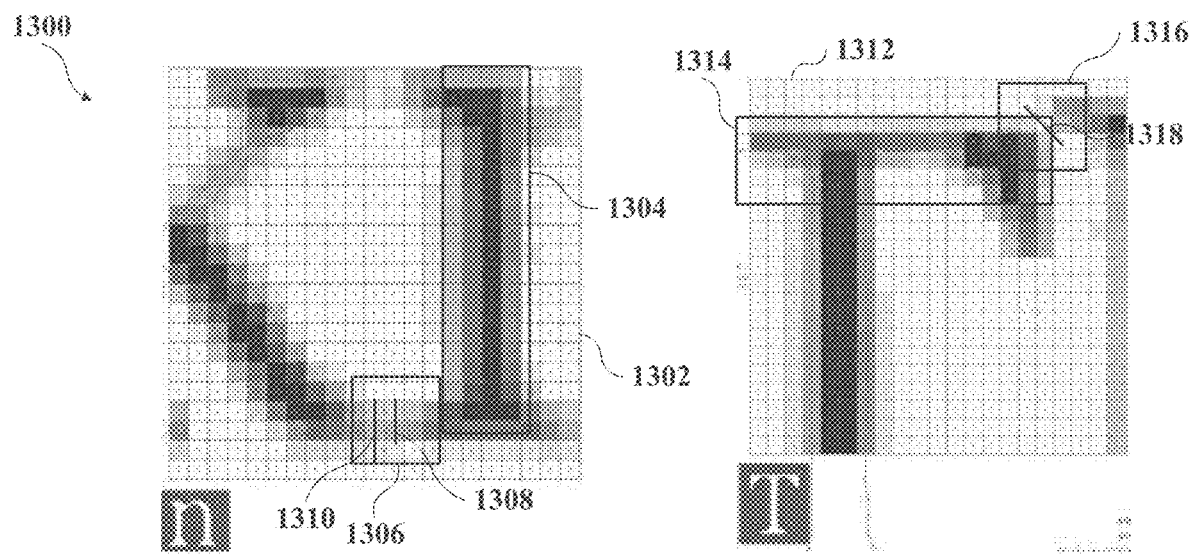
FIG. 13 is an illustration of symbol separation using kernels.

To determine whether two symbols are connected and how they are connected, a set of kernels may be applied over an image region. Each kernel is configured to identify a pattern of possible connection between two adjacent symbols. The kernels can be configured to identify different patterns (positions) of text pixels, background pixels, and edge pixels. FIG. 13 is an illustration 1300 of symbol separation using kernels.

In an example 1302, a text portion 1304 may in fact be a left edge of a letter "n". However, because the letter "n" is connected to another symbol to its left, as shown by a continuation area 1306, the boundaries of the letter "n" cannot be distinctly identified and the letter "n" may not be identified as such (e.g., as a distinct symbol). By applying the different kernels, one kernel configured to identify background pixels above edge pixels, background pixels below edge pixels, and high values on the left and right may identify the continuation area 1306 as being pixels that are due to anti-aliasing resulting in a lack of separation between consecutive symbols. The kernel may be associated with one or more cut lines. In this example, two cut lines 1308, 1310 are identified with the kernel. The cut lines indicate how the continuation area 1306 will be divided. That is, the cut lines indicate to which of the connected symbols the pixels of the continuation area 1306 will be assigned. In this case some of the pixels will be assigned to (e.g., are considered to belong to or be part of) the left symbol, some of the pixels will be assigned to the right symbol, and some symbol may be set to be background pixels.

In an example 1312, a text portion 1314 may in fact be a top edge of a letter "T." However, because the letter "T" is connected to another symbol to its right, as shown by a continuation area 1316, the top edge of the letter "T" cannot be distinctly identified. Similarly, by applying different kernel, one kernel configured to identify background pixels on one diagonal and edge pixels on another diagonal may identify the continuation area 1316 as being pixels that are due to anti-aliasing resulting in a lack of separation between consecutive symbols. A cut line 1318 is used to assign different pixels (pixels on different sides of the cut line 1318) of the continuation area 1316 to each of the two connected symbols.

Referring again to FIG. 9, the output of the symbol separation step, at 908, is to group pixels together. To group pixels together as a symbol, the technique 900 may select a text pixel (e.g., a pixel assigned the value 16 or is classified as a text pixel in the anti-aliasing map) as a seed pixel and expands outward, in all directions, to find all connected pixels. Encountered edge pixels are added to the group. Expansion stops in a direction when a background pixel is encountered.

It is noted that certain symbols or characters (e.g., "i", "j", "!", "?", ":") may be disjointed (e.g., are not connected) and may include more than one part. Using "i" as an illustrative example, the letter "i" includes a tittle (e.g., the dot) and a stem (the lower part or base). If a pattern is identified as matching a part of a disjointed symbol (e.g., the stem), then the technique 900 may search for other parts of the disjointed symbol (e.g., the dot) to group with the first matching part (e.g., the stem).

At 910, an upscaled binary map (an upscaled filled anti-aliasing map) is generated. Each anti-aliasing map is transferred into a respective upscaled binary map based on the scaling factor described above. That is, if a cell location in the anti-aliasing map has a value of k that is neither 0 or 16, then it is not necessarily the case that k sub-cells in the corresponding upscaled binary map will have a value of 1 and ($N^2$−k) will have a value of zero. To illustrate, if cells in the anti-aliasing map have values 0 and 16, then in the upscaled binary map, the corresponding upscaled cells will have 0 and 16 sub-cells with values of 1. On the other hand, if the value k=12, then it is not necessarily the case that 12 sub-cells will have a value of 1 and 4 sub-cells will have a value of 0.

Figure 14:
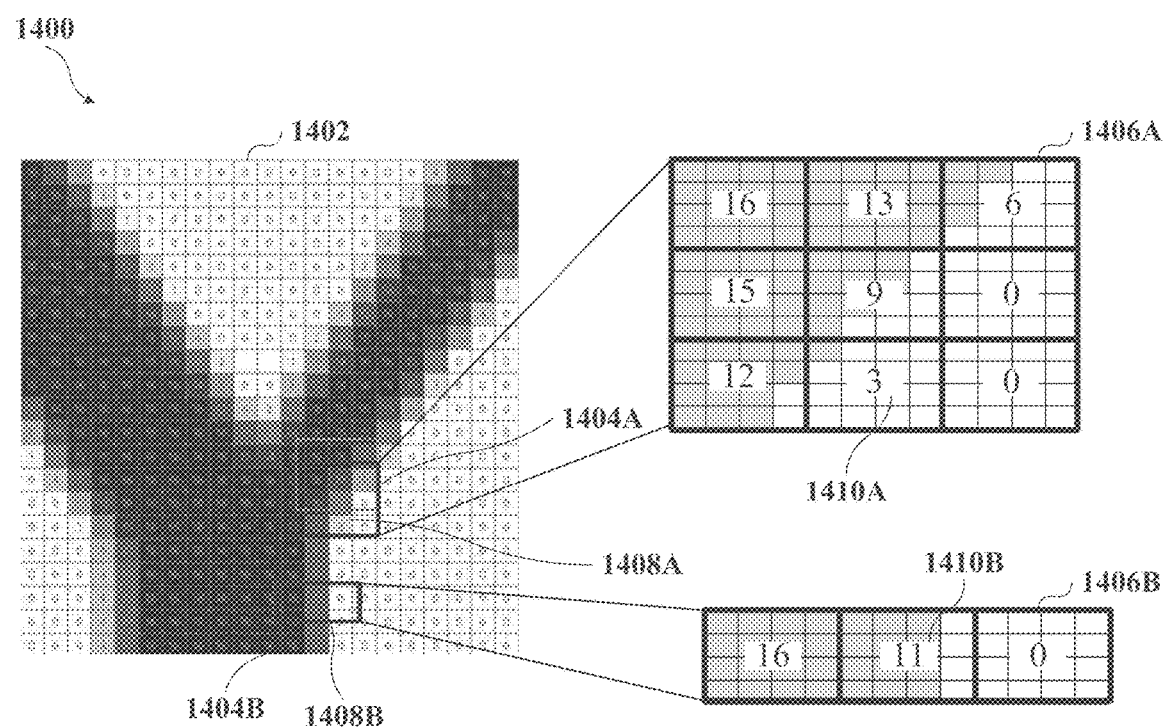
FIG. 14 illustrates an example of an upscaled binary map.

FIG. 14 illustrates an example 1400 of an upscaled binary map. A portion 1402 of an anti-aliasing map includes a first set of pixels 1404A and a second set of pixels 1404B and an upscaled binary map (not shown) includes corresponding portions 1406A and 1406B, respectively. The numbers of shaded sub-cells (i.e., sub-cells having values of 1) in the upscaled binary map corresponding to cells in the anti-aliasing map is set initially based on the value of the cell in the anti-aliasing map. That is, if the cell has a value of k, then k sub-cells will be set to 1 and ($N^2$−k) sub-cells are set to 0. However, which sub-cells are set to 0 and 1 may be modified as described below with respect to the step 912_4.

At 912 of FIG. 9, symbols are identified. A symbol is identified based on each of the upscaled binary maps. As already mentioned, all unique symbols are added to a text dictionary (e.g., the text dictionary 1706 of FIG. 17). If an identified symbol is already in the dictionary, then an index to the symbol in the dictionary is associated with the bounding box that includes the symbol. To identify a symbol based on an upscaled binary map, the technique 900 performs steps 912_2 and 912_4.

To identify a symbol, the technique 900 identifies smooth, closed edges based on the identified edge pixels. If smooth lines were not used, then there could be many different looking shapes for the same symbol. As mentioned with respect to FIG. 6C, a letter that is placed at ¼ pixel location will be different from the same letter placed at ½ pixel location. That is, these two letters will have different looking jagged edges. Identifying smooth contours for symbols, at 912_2, effectively identifies symbols that are as close as possible to their analog (e.g., non-sampled or digitized) versions.

Figure 15A:
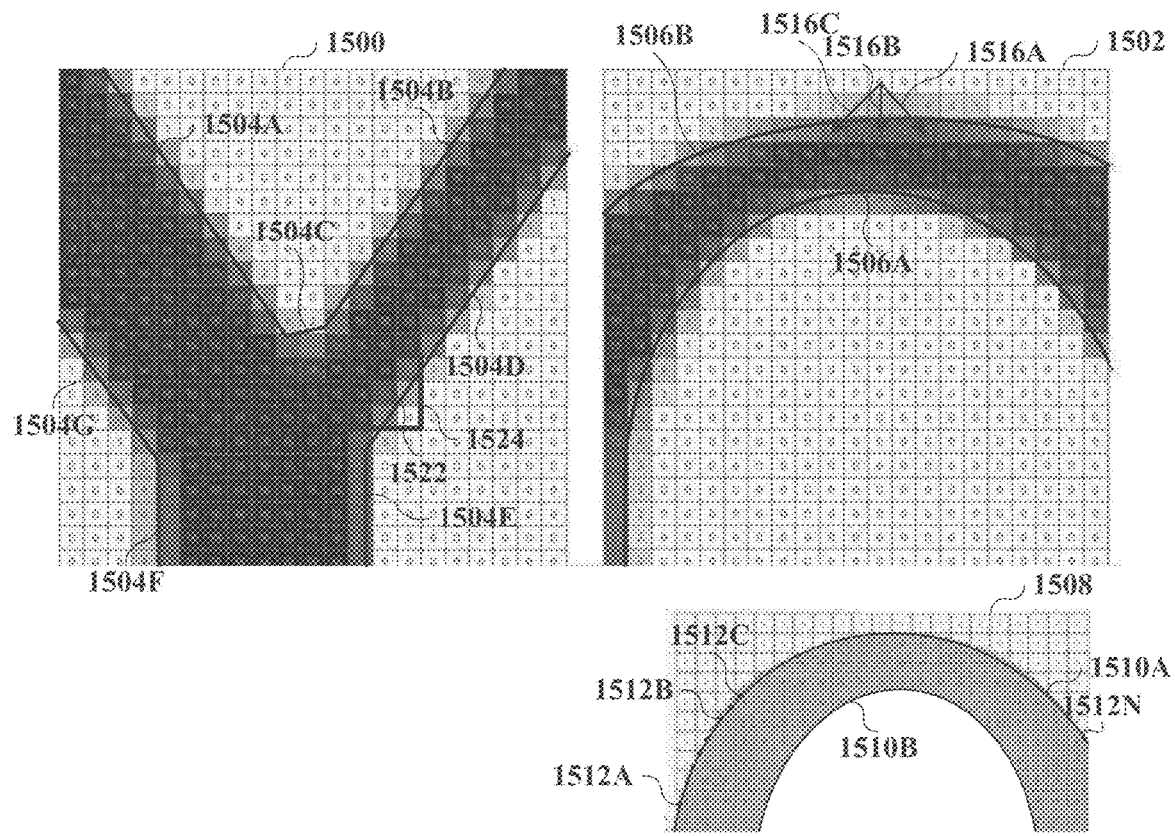
FIGS. 15A-15B illustrate the process and output of identifying a symbol.
Figure 15B:
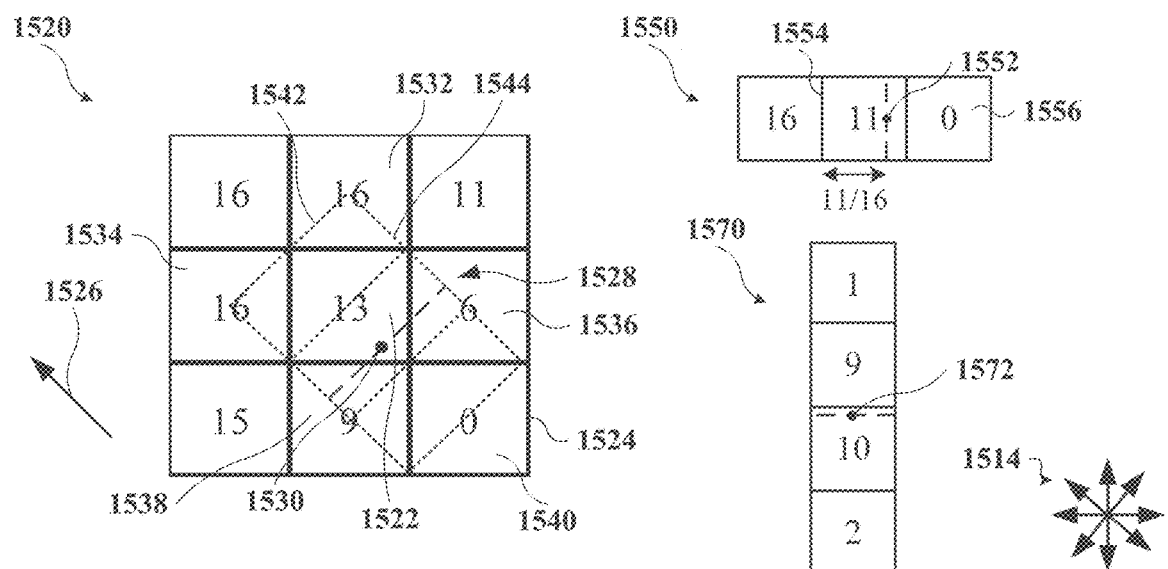

FIGS. 15A-15B illustrate the process and output of identifying a symbol. Again, the process aims at finding edges of symbols that are formed of smooth closed lines and edges for easy comparison with other symbols.

FIG. 15A illustrates examples of smooth edges of symbols. An example 1500 illustrates a portion of an anti-aliasing map corresponding to the letter "Y;" and an example 1502 illustrates a portion of an anti-aliasing map corresponding to the letter "O". The smooth edges are identified based on edge pixels (e.g., the pixels identified as edge pixels), or, equivalently, upscaled binary maps. As further described herein, the technique 900, at 912_2, identifies a closed contour of the letter "Y" of the example 1500 that includes the connected lines 1504A-1504G, and identifies a closed contour of the letter "O" that includes the curves 1506A-1506B. An example 1508 illustrates a portion of an upscaled binary map corresponding to the letter "O." The technique 900 identifies a closed contour of the letter "O" that includes the curves 1510A-1510B.

For each of the edge pixels, a point is identified. The identified points are then connected together to form the closed contour of the symbol. The example 1508 illustrates examples of such points, such as points 1512A-1512N. Any number of techniques (e.g., curve or line fitting techniques) can be used to connect the points into a closed contour. In an example, points are grouped to perform a regression. Two consecutive (adjacent) points can be connected together as part of a line or an arch if the distance between the two points is greater than a threshold (e.g., tan 22.5°). As such, when a change of direction is larger than the threshold, another point group is started. A regression is then performed on each point group. Arches and lines are then connected together by intersecting the lines or by polyline. Again, any number of techniques can be used to obtain closed contours based on a set of points. For example, regressions (e.g., curve fitting) can be performed to find each of the lines 1504A-1504G and each of the 1506A-1506B.

FIG. 15B illustrates examples of identifying the points to be connected to form smooth contours. At a high level, identifying the points can be based on the concepts of tunneling and gravity. For each edge pixel, several (e.g., three) candidate directions of possible directions that are closest to the gradient direction of background pixels (e.g., cells having 0 values in the anti-aliasing map) toward text pixels (e.g., cells having values 16 in the anti-aliasing map) are identified. The possible directions can be as given by gradient directions 1514. Namely, two vertical directions, two horizontal directions, and four 45° directions. To illustrate, when the direction of 0-to-16 (background pixels towards text pixels) is downwards, the three candidate directions can be as shown by arrows 1516A-1516C in FIG. 15A. Respective points are located for the candidate directions. The point that is closest to the text pixel (e.g., the cell value equal to 16) is selected. To reiterate, gravity directions are calculated and the most accurate is selected.

As mentioned, the location of a point is determined based on the concepts of tunneling and gravity. To illustrate, in a first example 1550, corresponding to vertical direction, the location of a point 1552 can be determined based on the distance that 11/16 from an edge 1554 since a right neighboring cell 1556 has a value of 0. A second example 1570 illustrates a special case where no text pixels (e.g., cell with a value of 16) in a given candidate gradient direction. In such cases, the location of a point 1572 can be based on a weighting of the adjacent cell values (here, 1, 9 and 2, 10). In this particular case, the location of the point 1572 leans towards, and is within, the cell with the higher value). The point 1572 is placed at a location that balances the weights on the two sides. Thus, the location can be calculated as (1+9+10+2)/2=22/2=11. The point 1572 is placed at the center axis of the tunnel.

in a third example 1520, consider a cell 1522 (also shown in FIG. 15A), the set of surrounding pixels 1524 (also shown in FIG. 15A), and the candidate gradient direction 1526. A tunnel 1528, in the direction of the candidate gradient direction 1526 is constructed (e.g., considered) around the cell 1522, which corresponds to a pixel classified as an edge pixel. The tunnel is imagined to be constructed of partition panels and is filled with sand (a grain of sand corresponding to a filled sub-cell in the upscaled binary map). The concept of gravity used herein posits that if the panels are removed, the sand (e.g., the filled sub-cells) will settle at (e.g., collapse to) a point 1530 that is considered to be on the smooth edge of the symbol.

The contributions to the tunnel 1528, in the number of filled sub-cells, of each of the cells 1532, 1534, 1536, 1538, 1540, and 1522 are 4 (=16/4), 4 (=16/4), 3 (=6/2), 4.5 (=9/2), 0 (=0/2), and 13, respectively. As such, there are 28.5 (=4+4+3+4.5+0+13) sub-cells in the tunnel 1528. That is, the area of the tunnel can be assumed to be 28.5. To be clear, the number of sub-cells that a cell contributes to the tunnel is based on the portion of that cell that is part of the tunnel. The sub-cells are arranged towards the candidate gradient direction 1526. Based on the upscaling described above (e.g., N=4), the side length of a pixel square is 4. Thus, a bottom 1542 of the tunnel 1528 is 4*$\sqrt{2}$; and a height 1544 should be 28.5/(4*$\sqrt{2}$)=5.038. The point can be placed at the center axis of the tunnel, such as shown with respect to the point 1530.

After the points are identified, they are connected as described above forming the contours of a symbol. At 912_4, the sub-cells of the upscaled binary map be re-filled. That which, the technique 900 may adjust which sub-cells are set to 0 (background cells) and which are set to 1 (text cells) based on the contours. Sub-cells within the symbol and crossed by the edge lines are set to 1 and all other sub-cells are set to 0.

In some implementations, some of the described aspects of the technique 900 can be adaptively applied at the symbol level.

In an example, prior to identifying edges at 912, a symbol may be removed from the text layer if the quality of the reconstructed symbol is low based on a pixel-by-pixel comparison to the original. In this context, "reconstruction" refers to a pixel value obtained from the upscaled binary map. Thus, for each symbol, a reconstructed symbol consisting of a set of pixels is obtained by converting each upscaled cell in the upscaled binary map back to a pixel value. Using the upscaled cell 1410A of FIG. 14 as an example, and assuming that the original pixel value in the image 702 of FIG. 7 is P, then the reconstructed pixel value would be 12/16*P. The reconstructed symbol is compared to the original symbol by calculating, for example, a sum of square differences (SSD) or some other different measure. If the difference measure is greater than a threshold, then the symbol (e.g., all of the contents of the bounding box) are placed back in the background image (e.g., the background image 720 of FIG. 7). To restate, the original symbol is compared with the reconstructed symbol to determine whether the reconstruction is accurate enough. If the construction is not accurate enough, the symbol is put back into the background and is not considered as text.

In an example, prior to comparing a reconstructed symbol to its corresponding original symbol, low pass filtering may be applied to the reconstructed symbol. Since the reconstructed symbol is recovered based on the upscaled binary bitmap, the edges of the reconstructed symbol may be sharper than those of the original symbol. Several filters may be applied. The one that results in the smallest error is used (e.g., selected). The selected filter (e.g., an index therefor) can be transmitted to the decoder in the text side information 718 of FIG. 7. After reconstructing a symbol, as further described herein, the decoder applies the filter to the reconstructed symbol.

As mentioned, the text extraction stage 706 outputs the background image 720. The background image 720 includes all content of the image 702 except the contents of the bounding boxes identified by the text extraction stage 706. As such, the background image 720 can be said to include holes. A hole, as used herein, is an area of the image 702 corresponding to the shape of an identified symbol. As such, a hole corresponds to or is composed of those pixel locations of pixels classified as "edge" and "text." The pixels of a bounding box classifies as "background" are added back to the background image 720.

Figure 16:
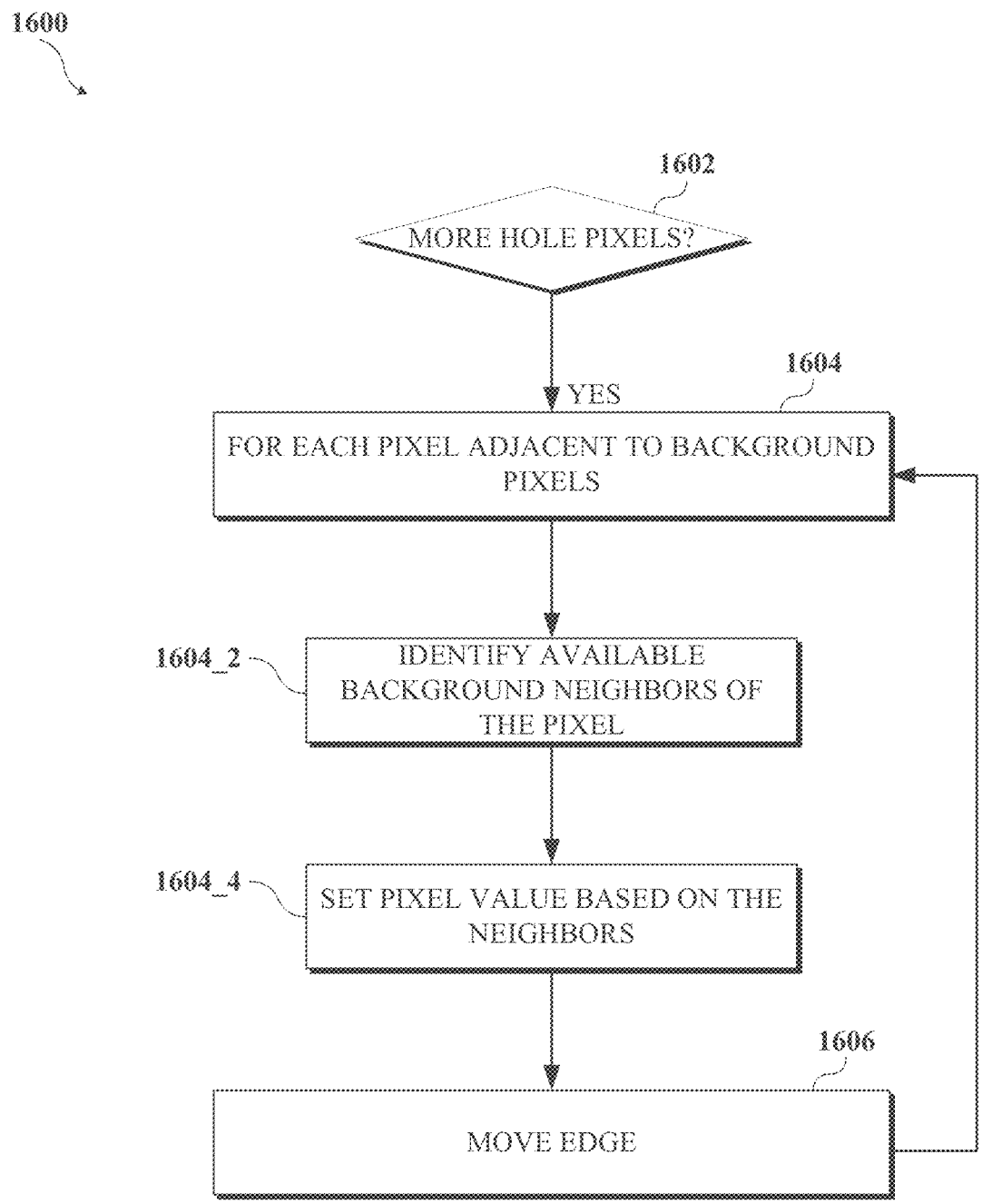
FIG. 16 is a flowchart of an example of a technique that can be used by a background filler stage to obtain a filled-in background image.

Still referring to FIG. 7, the background filler stage 708 generates a filled-in background image 722 from the background image 720. FIG. 16 is a flowchart of an example of a technique 1600 that can be used by the background filler stage 708 to obtain the filled-in background image 722. The technique 1600 can be applied to each of the color components of the background image 720. For example, in the case of YUV color space, the technique 1600 can be applied to each of the luminance component Y, the chrominance component U, and the chrominance component V.

At 1602, the technique 1600 checks whether there are more hole pixels to process (i.e., to assign pixels values to). If there are no more hole pixels, the technique 1600 ends (not shown); otherwise, the technique proceeds to 1604. At 1604, a loop iterates for each pixel adjacent to background pixels. For each such pixel, the technique 1600 performs the steps 1604_2 and 1604_4. In example, the pixels adjacent to the background pixels may be traversed (e.g., processed) in a circumferential manner. That is, the traversal involves moving either clockwise or counterclockwise around the perimeter of the hole, processing each pixel along the boundary until the circuit around the hole is completed. In an example, the traversal may start at a top-left corner of the hole.

At 1604_2, the technique 1600 identifies available background neighboring pixels of the pixel. In an example, immediate background neighboring pixels are identified. In another example, the available background neighbors can be those available background neighboring pixels in an M×M window that is centered at the pixel. In an example, M can be 3. At 1604_4, the pixel value is set based on the available background neighboring pixels. In an example, the pixel can be set to the average of their values, although other ways could be applied, such as using the maximum, minimum, or a weighted average where the weight for a neighboring pixel depends on its distance from the pixel.

At 1606, the edge of the hole is considered to have moved, indicating that the hole is getting smaller as new calculated pixel values become part of the background. From 1606, the technique 1600 proceeds back to 1602.

The image encoder stage 710 can be or implement any conventional encoder, such as any block-based image encoder. In an example, the image encoder stage 710 can be or implement the encoder 400 of FIG. 4. As such, the filled-in background image 722 can be encoded as described with respect to FIG. 4. The image encoder stage 710 produces an encoded or compressed bitstream, such as the compressed bitstream 420. The compressed bitstream produced by the image encoder stage 710 can be included in (multiplexed into) the compressed bitstream 714.

The text encoding stage 712 can use dictionary based techniques for encoding the identified symbols in the compressed bitstream 714. For example, Joint Bi-level Image Experts Group (JBIG)-like techniques can be used. JBIG is a standard for compressing images, particularly bi-level images such as black and white or grayscale images. JBIG employs a dictionary-based technique for encoding, where recurring patterns and structures within the image are stored as dictionary entries to avoid redundancy. To illustrate, assuming that 10 symbols were all identified as being the symbol "e", then instead of storing the bitmap data for each occurrence of "e", JBIG would store the pattern once in a dictionary and then reference that single dictionary entry for each subsequent occurrence, significantly reducing the size of the compressed bitstream 714. The text encoding stage 712 also encodes the cartesian coordinates of the symbols in the original image so that the decoder can determine where to overlay a symbol on the background image.

Figure 17:
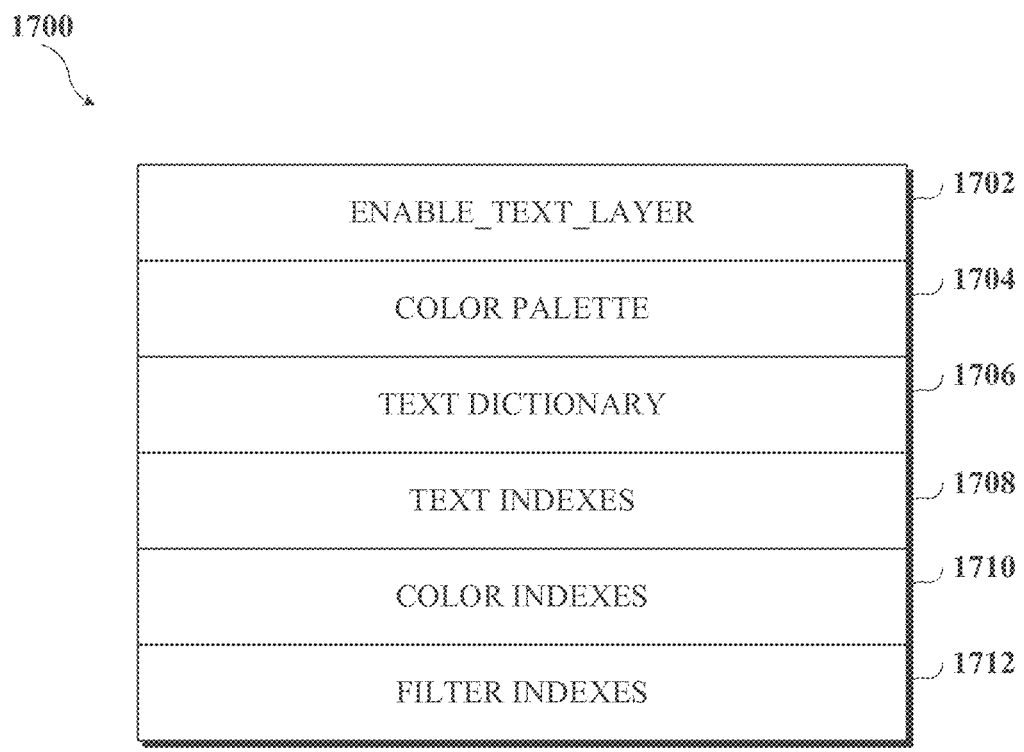
FIG. 17 illustrates data included in text side information.

The text side information 718 is also encoded into the compressed bitstream 714. FIG. 17 illustrates data 1700 included in the text side information 718. At least some of the data 1700 may be encoded in a header of an image.

A flag 1702 indicated whether the image was encoded using two-layer encoding as described herein. In some cases, no textual content may be found in a frame. As such, the image would not be encoded using two-layer encoding. In an example, whether two-layer encoding is performed can be based on whether compressing using two-layer encoding results in bitrate savings. That is, the encoder 700 may encode an image using the two-layer encoding and using conventional encoding, such as described with respect to FIG. 4. If the two-layer encoding results in bitrate savings, then a flag may be encoded in the compressed bitstream 714 that the frame is encoded using the two-layer encoding and, as such, the decoder is to decode the image as described with respect to FIG. 18.

A color palette 1704 is used to convey the text colors identified in the image. In an example the color palette 1704 can include the color information for each of the colors. In another example, the color palette 1704 can indicate that the color palette of another image is to be used. A text dictionary 1706 includes the upscaled binary bitmaps described above. The upscaled binary bitmaps can be stored in a compressed format in the text dictionary 1706. Any number of techniques (such as run-length encoding, to name one) can be used to compress the upscaled binary bitmaps. Text indexes 1708 includes, for each identified symbol in the image, an index into the text dictionary 1706. The text indexes may be compressed for storage in the text indexes 1708. Color indexes 1710 includes, for each identified symbol in the image, an index into the color palette 1704. The color indexes may be compressed for storage in the text indexes 1708. The filter indexes 1712 includes, for each identified symbol in the image, an index of a filter that is applied to the symbol. The filter indexes may be compressed for storage in the text indexes 1708. In an example, filters may not be applied. As such, the data 1700 would not include the filter indexes 1712.

Figure 18:
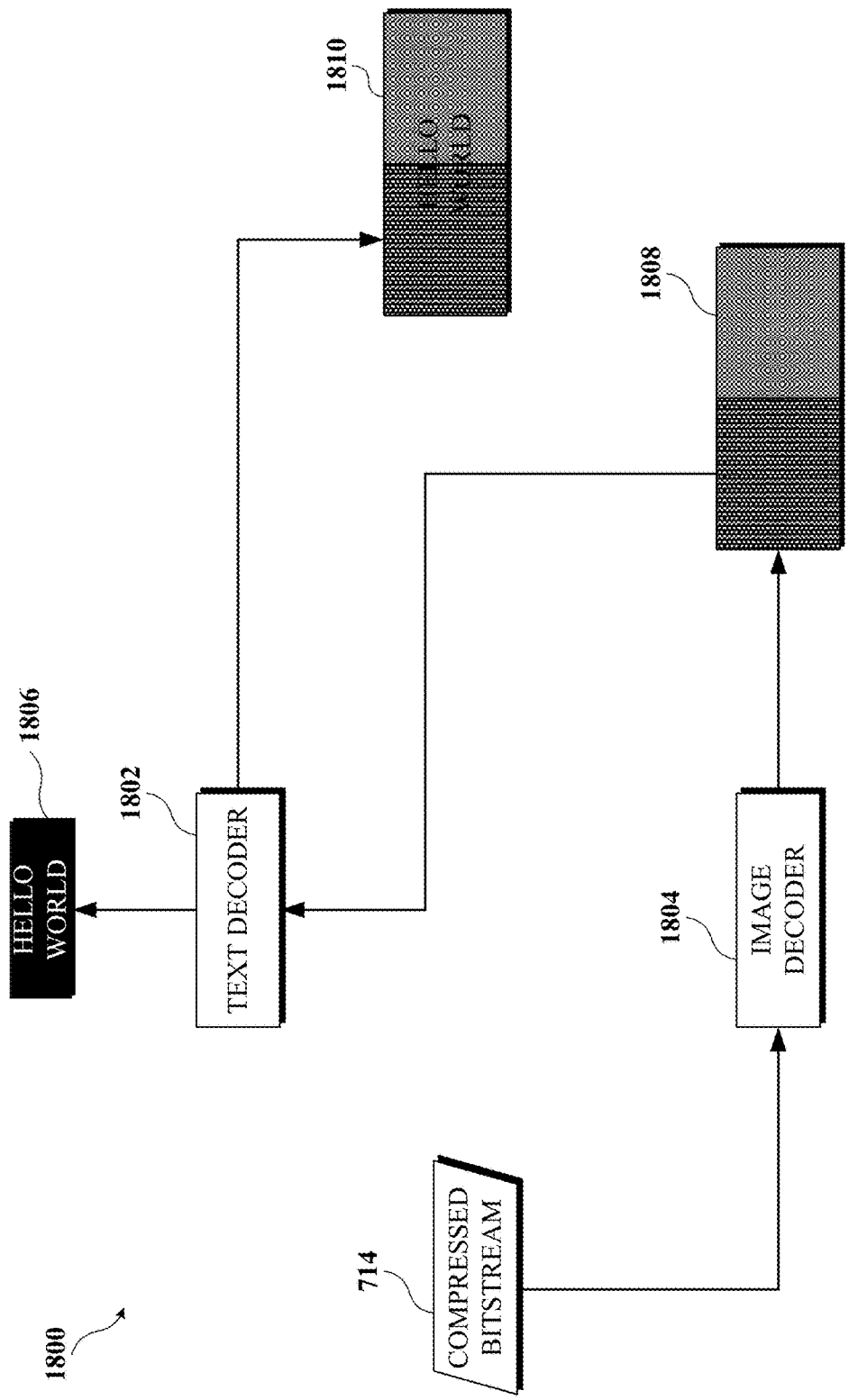
FIG. 18 is a block diagram of a decoder according to implementations of this disclosure.

FIG. 18 is a block diagram of a decoder 1800 according to implementations of this disclosure. The decoder 1800 can be implemented in the receiving station 106, for example, by providing a computer software program stored in the memory 204. The computer software program can include machine instructions that, when executed by a processor such as the processor 202, cause the receiving station 106 to decode video data in the manner described with respect to FIG. 18. The decoder 1800 can also be implemented in hardware included in, for example, the transmitting station 102 or the receiving station 106.

The decoder 1800 includes two stages: a text decoding stage 1802 and an image decoding stage 1804. When decoding an image (e.g., a frame of a video), the text decoding stage 1802 determines whether the image was encoded using two-layer encoding, as described herein. The text decoding stage 1802 may read a flag (e.g., the flag 1702 of FIG. 17) from the compressed bitstream 714 indicating whether the image is to be decoded using two-layer decoding. If the flag is set, then the text decoding stage 1802 proceeds with decoding the text; otherwise, the text decoding stage 1802 does not perform any further action on the image. The image decoding stage 1804 can be performed by a conventional decoder, such as the decoder 500 of FIG. 5. Thus, the image decoding stage 1804 decodes a reconstructed background image 1808 from the compressed bitstream 714.

If the image was encoded using two-layer encoding, then the text decoding stage 1802 proceeds to extract the information described with respect to FIG. 17 form the compressed bitstream 714. The text decoding stage 1802 fetches (e.g., decodes, retrieves, accesses) the text symbols from the dictionary and gets the locations, the colors, and (optionally) the filters to reconstruct the text portions 1806. The text decoding stage 1802 overlays the extracted text options over the reconstructed background image 1808 to obtain a reconstructed image 1810 that includes the text.

The text decoding stage 1802 uses the upscaled binary map associated with each symbol to apply anti-aliasing to edge pixels of the symbol. For each edge pixel, the aliasing formula described with respect to FIG. 8 is applied based on the number of sub-cells corresponding to that cell that indicated as background (e.g., having values of 0) vs. those indicated as text (e.g., having a values of 1). The two pixel values that are used to apply the aliasing formula are the pixel from the symbol and the corresponding pixel value in the reconstructed background image 1808.

Figure 19:
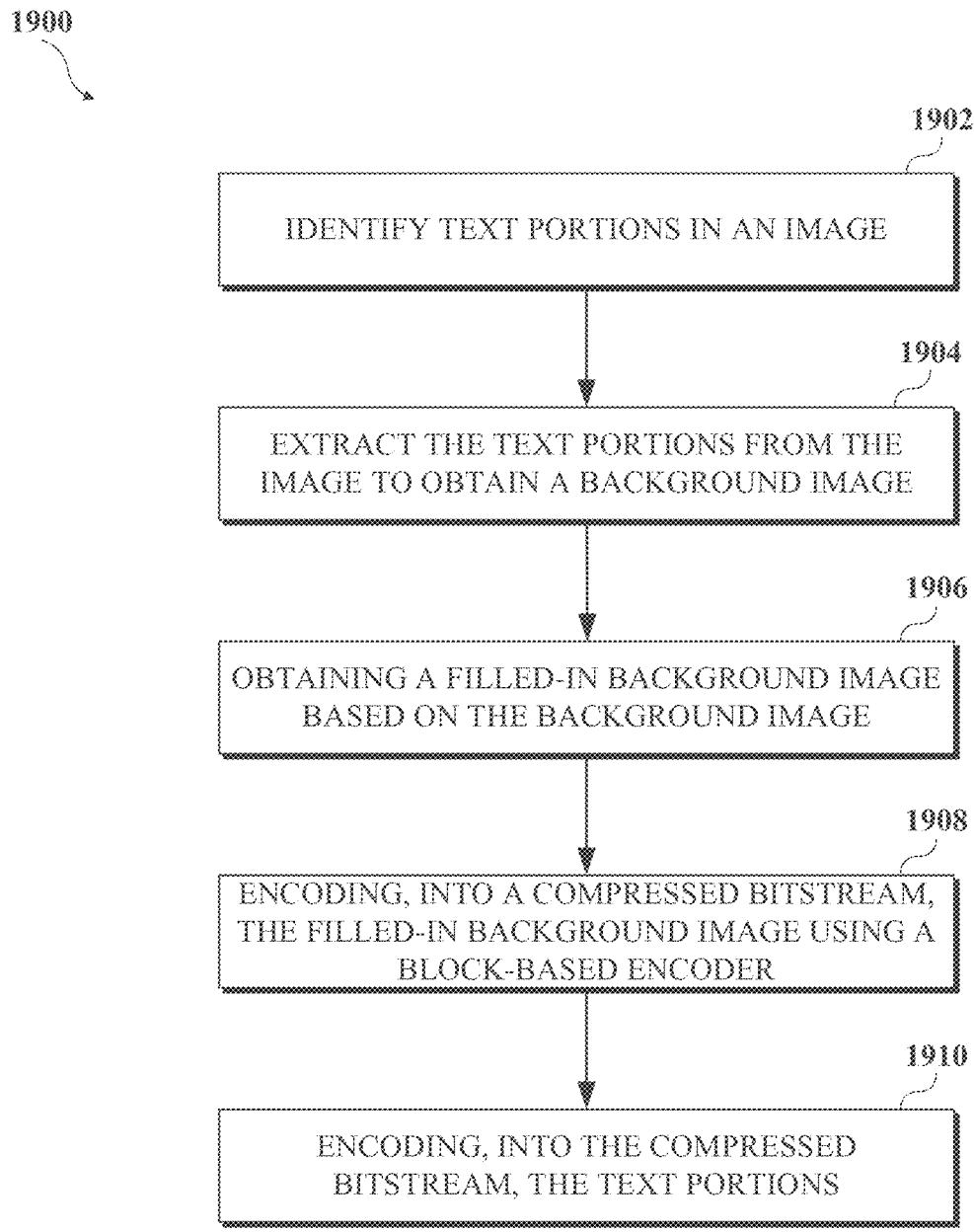
FIG. 19 is a flowchart of a technique for encoding an image that includes text content and a background.

FIG. 19 is a flowchart of a technique 1900 for encoding an image that includes text content and a background. The technique 1900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 1900. The technique 1900 may be implemented in whole or in part by the encoder 700 of FIG. 7. The technique 1900 can be implemented using specialized hardware or firmware. Multiple processors, memories, or both, may be used.

At 1902, text portions are identified in the image. The text portions in the image can be identified using OCR, which can return bounding boxes corresponding to the text portions. In an example, the text portions may be further split if they contain text content with multiple colors.

At 1904, the text portions are extracted from the image to obtain a background image. As described above, the background image includes holes corresponding to respective areas of the text portions within the image. At 1906, a filled-in background image is obtained based on the background image. The background refill process can be as described with respect to FIG. 16. As such, for each text portion of the text portions, a background refill process is initiated from pixels connected to the background image. A value of a current pixel is determined by calculating an average of respective pixel values of available neighboring background pixels. The background refill process is repeatedly applied, growing inward from pixels connected to the background image, until all pixels within the text portion are assigned respective values.

At 1908, the filled-in background image is encoded into a compressed bitstream using a conventional encoder. The conventional encoder can be a block-based encoder, such as the encoder 400 of FIG. 4. The compressed bitstream can be the compressed bitstream 714 of FIG. 7.

At 1910, the text portions are encoded into the compressed bitstream. Encoding the text portions can be as described above.

Encoding a text portion can include obtaining an anti-aliasing map based on classifying each pixel of the text portion as an edge pixel, a background pixel, or a text pixel. The pixels of a text portion can be classified based on an average background pixel value within the text portion and a maximum pixel value within the text portion. As described, the average background pixel value can be calculated based on pixels along a perimeter of the text portion. Respective values are associated with cells of the anti-aliasing map based on the classifying. An upscaled binary map is then obtained based on the anti-aliasing map. A first number of sub-cells corresponding to a cell of the anti-aliasing map is indicated as being text sub-cells based on a value associated with the cell. A smooth contour for a text symbol in the text portion is identified based on the anti-aliasing map. That is, the upscaled binary map with smooth contour can be directly obtained from the anti-aliasing map such as by connecting the group of points and filling the sub-pixels inside the closed contour. The modified upscaled binary map is then encoded in the compressed bitstream.

Encoding a text portion can include identifying connected symbols within a text portion by applying a set of kernels to detect patterns of possible connections between adjacent symbols. Encoding a text portion can include encoding in the compressed bitstream a color palette, a dictionary of symbols, indexes of the symbols in the dictionary of symbols, color indexes into the color palette, which can be as described above with respect to FIG. 17. A flag indicating whether the image is encoded using two-layer encoding that separately encodes the text content from the background pixels can also be encoded in the compressed bitstream.

Figure 20:
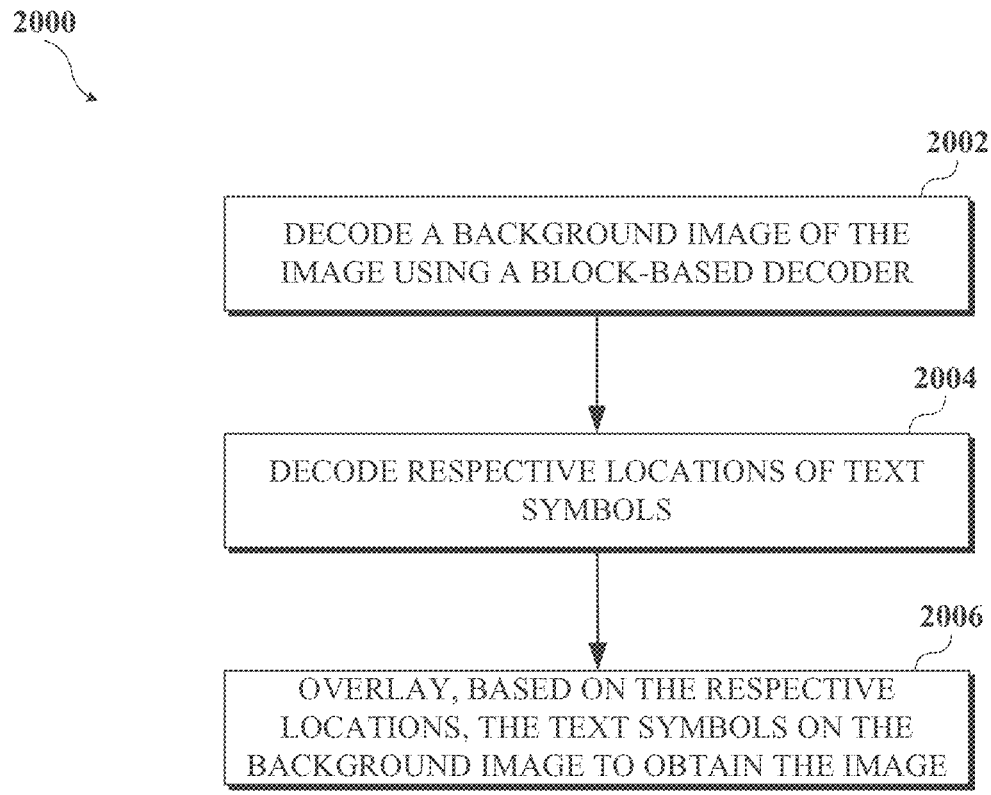
FIG. 20 is a flowchart of a technique for decoding an image that includes text content and a background.

FIG. 20 is a flowchart of a technique 2000 for decoding an image that includes text content and a background. The technique 2000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 2000. The technique 2000 may be implemented in whole or in part by the decoder 1800 of FIG. 18. The technique 2000 can be implemented using specialized hardware or firmware. Multiple processors, memories, or both, may be used.

At 2002, a background image of the image is decoded from a compressed bitstream using a conventional decoder. The conventional decoder can be a block-based decoder, such as the decoder 500 of FIG. 5. The compressed bitstream can be the compressed bitstream 714 of FIG. 18. At 2004, respective locations of text symbols are decoded from the compressed bitstream. The locations can be as described above with respect to FIG. 17. At 2006, the text symbols are overlayed on the background image based on the respective locations to obtain the image.

An upscaled binary image that includes, for each pixel of a text portion, a respective first number of a first binary value and a respective second number of a second binary value is also decoded from the compressed bitstream. An anti-aliasing function can be applied to each pixel based on the respective first number and the respective second number.

For simplicity of explanation, the techniques 900, 1600, 1900, and 2000 of FIGS. 9, 16, 19, and 20, respectively, are each depicted and described as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for coding an image that includes text content and a background, comprising:
    identifying text portions in the image;
    extracting the text portions from the image to obtain a background image, wherein the background image includes holes corresponding to respective areas of the text portions within the image;
    obtaining a filled-in background image based on the background image;
    encoding, in a compressed bitstream, a flag indicating whether the image is encoded using two-layer encoding that separately encodes the text content from the background;
    encoding, into the compressed bitstream, the filled-in background image using a block-based encoder; and
    encoding, into the compressed bitstream, the text portions.

2. The method of claim 1, wherein obtaining the filled-in background image based on the background image comprises:
    for a text portion of the text portions:
        initiating a background refill process from pixels connected to the background image;
        determining a value of a current pixel by calculating an average of respective pixel values of available neighboring background pixels; and
        repeatedly applying the background refill process, growing inward from pixels connected to the background image, until all pixels within the text portion are assigned respective values.

3. The method of claim 1, wherein encoding, into the compressed bitstream, the text portions comprises:
    for a text portion of the text portions:
        obtaining an anti-aliasing map based on classifying each pixel of the text portion as an edge pixel, a background pixel, or a text pixel, wherein respective values are associated with cells of the anti-aliasing map based on the classifying;
        obtaining an upscaled binary map based on the anti-aliasing map, wherein a first number of sub-cells corresponding to a cell of the anti-aliasing map is indicated as being text sub-cells based on a value associated with the cell;
        identifying a smooth contour for a text symbol in the text portion based on the anti-aliasing map;
        modifying the upscaled binary map to obtain a modified upscaled binary map based on the smooth contour by setting sub-cells within the text symbol and crossed by the smooth contour to indicate text sub-cells and setting other sub-cells to indicate background sub-cells; and
        encoding the modified upscaled binary map in the compressed bitstream.

4. The method of claim 3, wherein classifying the each pixel is based on an average background pixel value within the text portion and a maximum pixel value within the text portion.

5. The method of claim 4, wherein the average background pixel value is calculated based on pixels along a perimeter of the text portion.

6. The method of claim 1, wherein encoding, into the compressed bitstream, the text portions comprises:
    identifying connected symbols within a text portion by applying a set of kernels to detect patterns of possible connections between adjacent symbols.

7. The method of claim 1, wherein the text portions in the image are identified using optical character recognition (OCR).

8. The method of claim 1, wherein encoding, into the compressed bitstream, the text portions comprises:
    encoding in the compressed bitstream:
        a color palette;
        a dictionary of symbols;
        indexes of the symbols in the dictionary of symbols; and
        color indexes into the color palette.

9. A device for coding an image that includes text content and a background, comprising:
a processor configured to:
identify text portions in the image;
extract the text portions from the image to obtain a background image, wherein the background image includes holes corresponding to respective areas of the text portions within the image;
obtain a filled-in background image based on the background image;
encode, in a compressed bitstream, a flag indicating whether the image is encoded using two-layer encoding that separately encodes the text content from the background;
encode, into the compressed bitstream, the filled-in background image using a block-based encoder; and
encode, into the compressed bitstream, the text portions.

10. The device of claim 9, wherein to obtain the filled-in background image based on the background image comprises to:
for a text portion of the text portions:
initiate a background refill process from pixels connected to the background image;
determine a value of a current pixel by calculating an average of respective pixel values of available neighboring background pixels; and
repeatedly apply the background refill process, growing inward from pixels connected to the background image, until all pixels within the text portion are assigned respective values.

11. The device of claim 9, wherein to encode, into the compressed bitstream, the text portions comprises to:
for a text portion of the text portions:
obtain an anti-aliasing map based on classifying each pixel of the text portion as an edge pixel, a background pixel, or a text pixel, wherein respective values are associated with cells of the anti-aliasing map based on the classifying;
obtain an upscaled binary map based on the anti-aliasing map, wherein a first number of sub-cells corresponding to a cell of the anti-aliasing map is indicated as being text sub-cells based on a value associated with the cell;
identify a smooth contour for a text symbol in the text portion based on the anti-aliasing map;
modify the upscaled binary map to obtain a modified upscaled binary map based on the smooth contour by setting sub-cells within the text symbol and crossed by the smooth contour to indicate text sub-cells and setting other sub-cells to indicate background sub-cells; and
encode the modified upscaled binary map in the compressed bitstream.

12. The device of claim 11, wherein the each pixel is classified based on an average background pixel value within the text portion and a maximum pixel value within the text portion.

13. The device of claim 12, wherein the average background pixel value is calculated based on pixels along a perimeter of the text portion.

14. The device of claim 9, wherein to encode, into the compressed bitstream, the text portions comprises to:
identify connected symbols within a text portion by applying a set of kernels to detect patterns of possible connections between adjacent symbols.

15. The device of claim 9, wherein the text portions in the image are identified using optical character recognition (OCR).

16. The device of claim 9, wherein to encode, into the compressed bitstream, the text portions comprises to:
encode in the compressed bitstream:
a color palette;
a dictionary of symbols;
indexes of the symbols in the dictionary of symbols; and
color indexes into the color palette.

17. A method for decoding an image comprising:
decoding, from a compressed bitstream, a flag indicating that the image is encoded using two-layer encoding that separately encodes text content of the image from a background image of the image;
decoding, from the compressed bitstream, the background image of the image using a block-based decoder;
decoding, from the compressed bitstream, respective locations of text symbols; and
overlaying, based on the respective locations, the text symbols on the background image to obtain the image.

18. The method of claim 17, further comprising:
decoding, from the compressed bitstream, an upscaled binary image that includes, for each pixel of a text portion, a respective first number of a first binary value and a respective second number of a second binary value; and
applying an anti-aliasing function to the each pixel based on the respective first number and the respective second number.

19. The method of claim 17, further comprising:
decoding, from the compressed bitstream, a color palette and a dictionary of symbols;
decoding, from the compressed bitstream, indexes of the text symbols in the dictionary of symbols and color indexes into the color palette; and
reconstructing the text symbols based on the dictionary of symbols and applying colors to the text symbols based on the color palette.

20. The method of claim 18, further comprising:
decoding, from the compressed bitstream, filter indexes for the text symbols; and
applying respective filters to reconstructed text symbols based on the filter indexes to reduce sharpness differences between the reconstructed text symbols and original text symbols in the image.

* * * * *